US012499824B2

(12) United States Patent
Lee et al.

(10) Patent No.: US 12,499,824 B2
(45) Date of Patent: Dec. 16, 2025

(54) DISPLAY DEVICE AND METHOD OF COMPENSATING FOR DEGRADATION THEREOF

(71) Applicant: SAMSUNG DISPLAY CO., LTD., Yongin-si (KR)

(72) Inventors: Jae Hoon Lee, Yongin-si (KR); Tetsuhiro Tanaka, Yongin-si (KR); Dae Seop Kim, Yongin-si (KR); Cheol Min Kim, Yongin-si (KR); Byung Hyuk Shin, Yongin-si (KR); Hai Jung In, Yongin-si (KR); Byung Ki Chun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/817,333

(22) Filed: Aug. 3, 2022

(65) Prior Publication Data

US 2023/0134326 A1 May 4, 2023

(30) Foreign Application Priority Data

Nov. 3, 2021 (KR) ........................ 10-2021-0150065

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); (Continued)

(58) Field of Classification Search
CPC ................................................ G09G 2320/043
See application file for complete search history.

(56) References Cited

U.S. PATENT DOCUMENTS

| | | | |
|---|---|---|---|
| 9,349,317 | B2 | 5/2016 | Kim et al. |
| 10,431,155 | B2 | 10/2019 | Moon et al. |

(Continued)

FOREIGN PATENT DOCUMENTS

| | | | |
|---|---|---|---|
| KR | 10-2014-0091095 | A | 7/2014 |
| KR | 10-2016-0032759 | A | 3/2016 |

(Continued)

OTHER PUBLICATIONS

Full Translation of KR 10-2016-0032759, 31 pages.

*Primary Examiner* — Priyank J Shah
(74) *Attorney, Agent, or Firm* — F. CHAU & ASSOCIATES, LLC

(57) ABSTRACT

A display device may include first pixels disposed in a display area and including respective first driving transistors. A second pixel is disposed in a non-display area and includes a second driving transistor. A sensor is configured to sense a current of the second pixel during a sensing period and generate sensing data. A degradation compensator is configured to convert first image data into second image data. A data driver is configured to generate data signals based on the second image data and supply the data signals to the first pixels. The degradation compensator calculates an age of the first pixels based on accumulating the second image data, converts the first image data into the second image data by deriving a compensation value from representative compensation data according to the age of the first pixels, and calibrates the representative compensation data based on the sensing data.

22 Claims, 14 Drawing Sheets

(52) U.S. Cl.
CPC . *G09G 2300/0852* (2013.01); *G09G 2310/08* (2013.01); *G09G 2320/0233* (2013.01); *G09G 2320/043* (2013.01)

(56) References Cited

U.S. PATENT DOCUMENTS

| | | | | |
|---|---|---|---|---|
| 10,482,821 | B2 | 11/2019 | Yang et al. | |
| 2008/0143654 | A1* | 6/2008 | Chiou | G09G 3/3233 345/82 |
| 2014/0176409 | A1* | 6/2014 | Kim | G09G 3/3233 345/92 |
| 2016/0133193 | A1* | 5/2016 | Lee | G09G 3/3275 345/694 |
| 2017/0025061 | A1* | 1/2017 | Takizawa | G09G 3/3291 |
| 2017/0213493 | A1* | 7/2017 | Han | G09G 3/3208 |
| 2019/0180682 | A1* | 6/2019 | Kim | H10K 50/15 |
| 2020/0349894 | A1* | 11/2020 | Ko | G09G 3/006 |
| 2020/0372861 | A1 | 11/2020 | Ok et al. | |
| 2022/0122540 | A1* | 4/2022 | Choi | G09G 3/3233 |
| 2023/0075449 | A1* | 3/2023 | Ji | G11C 19/28 |

FOREIGN PATENT DOCUMENTS

| | | | |
|---|---|---|---|
| KR | 10-2018-0009407 | A | 1/2018 |
| KR | 10-2018-0030342 | | 3/2018 |
| KR | 10-1955423 | | 5/2019 |
| KR | 10-1982825 | | 5/2019 |
| KR | 10-2019-0067956 | A | 6/2019 |
| KR | 10-2020-0134584 | | 12/2020 |

* cited by examiner

SL: SL1, SL2, SL3
DRS1: GW, GR, GI, EM, Vdata

CL: CL1, CL2, CL3, CL4
DRS2: CS1, CS2, CS3, CS4, Vgr

DRS2: CS1, Vgr

DISPLAY DEVICE AND METHOD OF COMPENSATING FOR DEGRADATION THEREOF

This application claims priority under 35 U.S.C. § 119 to Korean Patent Application No. 10-2021-0150065, filed on Nov. 3, 2021, the contents of which is herein incorporated by reference in its entirety.

TECHNICAL FIELD

The present disclosure relates to a display and, more particularly, to a display device and a method of compensating for degradation thereof.

DISCUSSION OF THE RELATED ART

In recent years, various display devices have been incorporated into electronic device such as smartphones, television sets, computer monitors, and the like. Of paramount importance is the quality of those display devices. Some types of display devices are known to deteriorate as they age. Accordingly, many display devices are known to become less desirable as they age.

SUMMARY

A display device includes first pixels disposed in a display area and including respective first driving transistors. A second pixel is disposed in a non-display area and includes a second driving transistor. A sensor is configured to sense a current of the second pixel during a sensing period to generate sensing data. A degradation compensator is configured to convert first image data to generate second image data therefrom. A data driver is configured to generate data signals based on the second image data and supply the data signals to the first pixels. The degradation compensator calculates an age of the first pixels based on accumulated data obtained by accumulating the second image data, converts the first image data into the second image data by deriving a compensation value from representative compensation data according to the age of the first pixels, and calibrates the representative compensation data based on the sensing data.

The sensor may generate the sensing data by periodically sensing the current of the second pixel. The degradation compensator may calibrate a first compensation value of an age corresponding to a time point when the sensing data is generated, among compensation values included in the representative compensation data.

The degradation compensator may derive initial threshold voltage information of the second driving transistor from the sensing data and may derive the first compensation value from the representative compensation data by comparing the initial threshold voltage information of the second driving transistor with pre-stored sample threshold voltage information.

The degradation compensator may calculate a second compensation value based on the sensing data and may calibrate the first compensation value by a difference between the first compensation value and the second compensation value.

The degradation compensator may include an accumulator configured to generate the accumulated data, a memory configured to store the accumulated data and the representative compensation data, an age calculator configured to calculate the age of the first pixels based on the accumulated data, a data converter configured to derive the compensation value from the representative compensation data according to the age of the first pixels, and convert the first image data into the second image data by applying the compensation value, and a calibrator configured to calculate a calibration value of the representative compensation data based on the sensing data and calibrate the representative compensation data by applying the calibration value.

The second pixel may include at least two second pixels. The sensor may generate sensing data corresponding to each of the at least two second pixels by sensing a current flowing through the at least two second pixels during the sensing period.

The degradation compensator may individually store the representative compensation data corresponding to each of the at least two second pixels and may individually calibrate the representative compensation data corresponding to each of the at least two second pixels based on the sensing data corresponding to each of the at least two second pixels.

The first pixels may include first color pixels, second color pixels, and third color pixels. Each of the second pixels may receive a grayscale voltage corresponding to a voltage of a data signal supplied to the first color pixels, the second color pixels, or the third color pixels with respect to at least one reference grayscale during the sensing period.

The degradation compensator may convert data corresponding to the first color pixels of the first image data, by using the representative compensation data corresponding to a second pixel receiving a grayscale voltage corresponding to a voltage of a data signal supplied to the first color pixels.

The display area may be divided into at least two blocks including each of the first pixels based on the two or more second pixels. The degradation compensator may convert data corresponding to the first pixels of each block among the first image data based on the representative compensation data corresponding to one second pixel of the at least two second pixels that is adjacent to a corresponding block.

The degradation compensator may calculate the age of the first pixels based on initial threshold voltage information of the first driving transistors and the accumulated data.

The first pixels may be divided into at least two groups according to position. The initial threshold voltage information of the first driving transistors included in the first pixels of each group may be stored for each group.

Each of the first pixels may include a first pixel circuit including the first driving transistor, and a light emitting element connected to the first pixel circuit.

The first pixel circuit may include a first switching transistor connected between a data line and a first node connected to a gate electrode of the first driving transistor and turned on in response to a first scan signal, a second switching transistor connected between a reference power line to which a reference power voltage is applied and the first node, and turned on in response to a second scan signal, a first capacitor connected between a second node between the first driving transistor and the light emitting element and the first node, a third switching transistor connected between an initialization power line to which an initialization power voltage is applied and the second node, and turned on in response to a third scan signal, a fourth switching transistor connected between a first power line to which a first power voltage is applied and the first driving transistor, and turned off in response to an emission control signal, and a second capacitor connected between the first power line and the second node.

The second pixel may include a second pixel circuit including the second driving transistor, and a light emitting element or a non-light emitting diode connected to the second pixel circuit.

The first pixel circuit and the second pixel circuit may have a same structure as each other.

The first pixel circuit and the second pixel circuit may have different structures from one another.

The display device may further include a switch connected between the second pixel and the sensor. The switch may be turned on during the sensing period.

The second pixel may receive a grayscale voltage corresponding to at least one reference grayscale during the sensing period and may receive a grayscale voltage corresponding to a highest grayscale during a display period in which the first pixels are driven except for the sensing period.

A display device includes first pixels disposed in a display area and including respective first driving transistors. A second pixel is disposed in a non-display area and includes a second driving transistor. A method of compensating for degradation of the display device includes generating sensing data by sensing a current of the second pixel during a sensing period, calibrating representative compensation data based on the sensing data, calculating each of compensation values according to an age of the first pixels by using the representative compensation data, converting first image data into second image data by applying the compensation values, generating data signals corresponding to the second image data, and driving the first pixels by the data signals.

A display device includes a plurality of first pixels disposed within a display area of the display device. A second pixel is disposed within a non-display area of the display device. A sensor is configured to sense a current of the second pixel. An image compensator is configured to receive a first image signal, convert the received first image signal to a second image signal based on the sensed current of the second pixel, and display the second image signal on the plurality of first pixels.

The image compensator may be further configured to calculate an accumulated sensed current of the second pixel over time, estimate a degree of accumulated usage of the plurality of first pixels from the accumulated sensed current of the second pixel over time, and convert the received first image signal into the second image signal based on the estimated degree of accumulated usage of the plurality of first pixels.

The display device may further include a memory for storing a table of compensation values for converting the received first image signal to a second image signal based on the sensed current of the second pixel.

BRIEF DESCRIPTION OF THE DRAWINGS

The above and other features of the present disclosure will become more apparent by describing in further detail embodiments thereof with reference to the accompanying drawings, in which.

DETAILED DESCRIPTION OF THE EMBODIMENT

Figure 1:
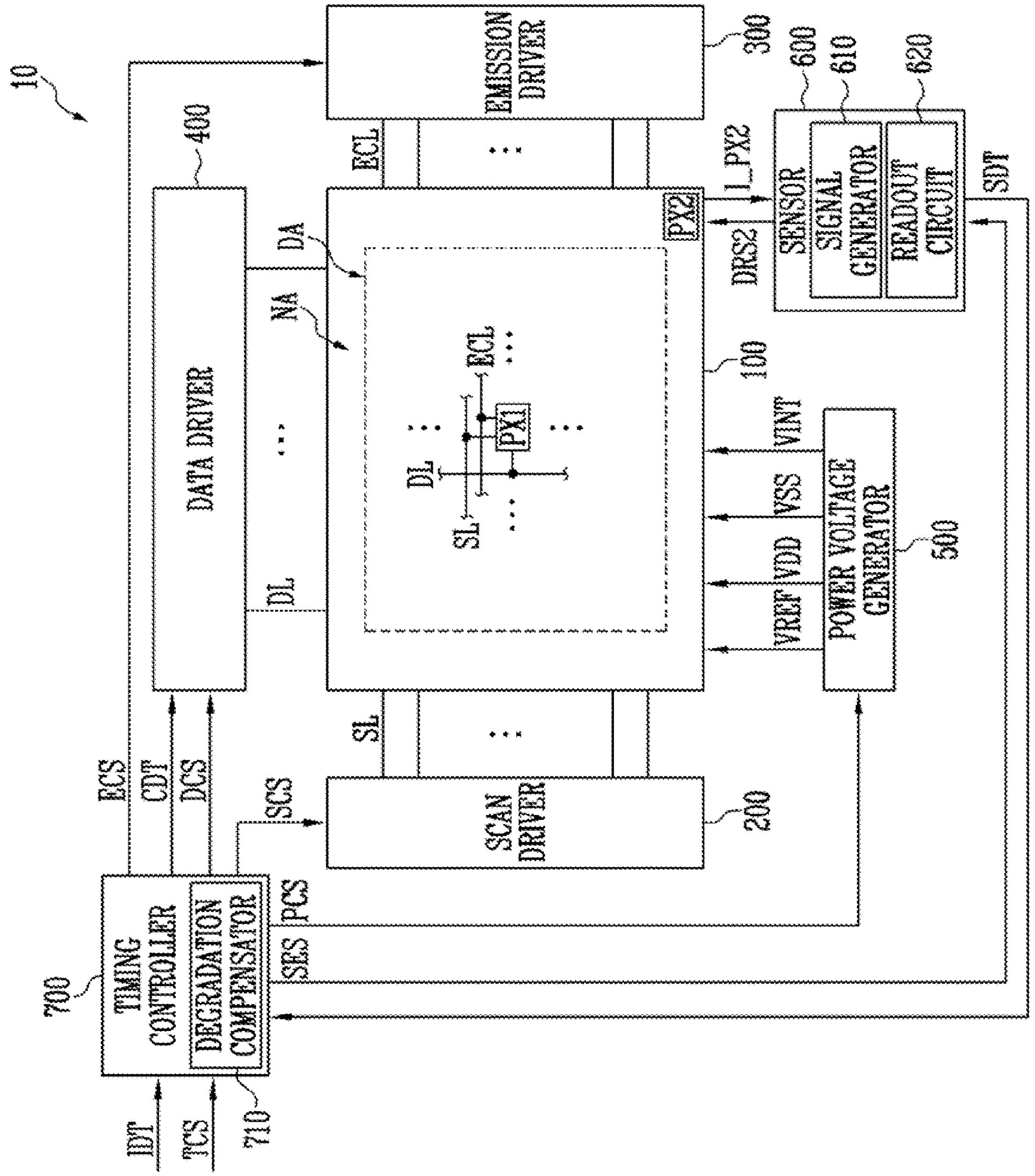
FIG. 1 is a block diagram illustrating a display device according to an embodiment of the present disclosure.

Since the present disclosure may have various changes and may have various forms, specific embodiments are illustrated in the drawings and described in detail herein. In the following description, a singular expression may also include a plural meaning unless the singular expression clearly includes only a singular expression on context.

It should be understood that the present disclosure is not necessarily limited to the embodiments disclosed below and includes all modifications, equivalents, and substitutes included in the spirit and technical scope of the present disclosure. In addition, each embodiment disclosed below may be implemented alone or in combination with at least another or other embodiments.

In the drawings, the same reference numerals may be used to represent the same or similar elements throughout the specification and the figures, even though the same or similar elements are indicated on different drawings. In describing the embodiments of the present disclosure with reference to the drawings, to the extent that a detailed description of one or more elements has been omitted, it may be assumed that those elements are at least similar to corresponding elements that have been described elsewhere within the present disclosure.

In describing the embodiments, a term “connection” may include a meaning of a physical and/or electrical connection. In addition, the term “connection” may include a meaning of a direct and/or indirect connection and may include a meaning of an integral and/or non-integral connection.

FIG. 1 is a block diagram illustrating a display device 10 according to an embodiment of the present disclosure.

Referring to FIG. 1, the display device 10 may include a display panel 100, a scan driver 200, an emission driver 300, a data driver 400, a power voltage generator 500, a sensor 600, and a timing controller 700.

The display panel 100 may include a display area DA and a non-display area NA. The display area DA may be an area in which an image corresponding to input image data IDT (hereinafter, referred to as "first image data IDT") is displayed by first pixels PX1. The non-display area NA may be an area of the display panel 100 other than the display area DA, and may be positioned around the display area DA. In an embodiment, the non-display area NA may be disposed on an edge area of the display panel 100 to at least partially surround the display area DA. The non-display area NA might not display an image.

In the display area DA, scan lines SL, emission control lines ECL, data lines DL, and the first pixels PX1 may be disposed. The first pixels PX1 may be electrically connected to each of the scan lines SL, each of the emission control lines ECL, and each of the data lines DL. For example, each of the first pixels PX1 may be electrically connected to a scan line SL and an emission control line ECL disposed on a corresponding horizontal line, and a data line DL disposed on a corresponding vertical line. In FIG. 1, each of the first pixels PX1 is connected to one scan line SL, but embodiments are not necessarily limited thereto. For example, two or more scan lines SL to which different scan signals are applied may be disposed on each horizontal line, and each first pixel PX1 may be electrically connected to the two or more scan lines SL.

The first pixels PX1 may receive respective first driving signals and may emit light with a luminance corresponding to the first driving signals. In an embodiment, the first driving signals may include respective scan signals supplied to the first pixels PX1 through respective scan lines SL, respective emission control signals supplied to the first pixels PX1 through respective emission control lines ECL, and respective data signals supplied to the first pixels PX1 through respective data lines DL.

The first pixels PX1 may receive driving voltages from the power voltage generator 500. In an embodiment, the driving voltages may include a first power voltage VDD (for example, a high potential pixel voltage) and a second voltage VSS (for example, a low potential pixel voltage), and may further at least one of a reference power voltage VREF and an initialization power voltage VINT.

The signal lines and the power lines connected to the first pixels PX1, and the first driving signals and the driving voltages supplied from the signal lines and the power lines are not necessarily limited to the above-described embodiment. The signal lines, the power lines, the first driving signals, and/or the driving voltages connected to the first pixels PX1 may be variously changed in response to a circuit structure and/or a driving method of the first pixels PX1.

In the non-display area NA, lines connected to the first pixels PX1, the second pixel PX2, and lines connected to the second pixel PX2 may be disposed. For example, the non-display area NA may include one portions of each of the scan lines SL, the emission control lines ECL, and/or the data lines DL (or connection lines electrically connected to the scan lines SL, the emission control lines ECL, and/or the data lines DL), the second pixel PX2, and signal lines electrically connected to the second pixel PX2 (for example, control lines CL of FIG. 5 (or a first control line CL1 of FIG. 6) and a dummy data line DDL), and power lines (for example, a first power line PL1, a second power line PL2, a reference power line RFL, and/or an initialization power line INL of FIG. 3, 5, or 6) electrically connected to the first and second pixels PX1 and PX2.

The second pixel PX2 may be provided in the display panel 100 and may be positioned around the first pixels PX1. For example, the second pixel PX2 may be disposed in the non-display area NA of the display panel 100. In an embodiment, the second pixel PX2 may be formed simultaneously with the first pixels PX1.

The second pixel PX2 may receive second driving signals DRS2 and driving voltages. In an embodiment, the second driving signals DRS2 may include control signals for controlling switching elements (for example, switching transistors) provided in the second pixel PX2, and a grayscale voltage for controlling a current I_PX2 of the second pixel PX2 (for example, a driving current flowing through the second pixel PX2 by a second driving transistor provided to the second pixel PX2). The second driving signals DRS2 may be a signal of a type and/or a waveform similar to a type and/or a waveform of the first driving signals (for example, respective scan signals, emission control signals, and data signals) for driving the first pixels PX1, but embodiments are not necessarily limited thereto.

In an embodiment, the second driving signals DRS2 may be independently supplied from the sensor 600 separately from the first driving signals. For example, the second driving signals DRS2 may be generated by the signal generator 610 of the sensor 600 based on sensor driving signals SES supplied from the timing controller 700 to the sensor 600 and may be supplied to the second pixel PX2. Accordingly, the first pixels PX1 may be driven independently from the second pixel PX2. In an embodiment, the second pixel PX2 may be electrically connected to the scan driver 200, the emission driver 300 and/or the data driver 400 and may receive the second driving signals DRS2 from the scan driver 200, the emission driver 300 and/or the data driver 400.

The second pixel PX2 may or might not include a light emitting element. When the second pixel PX2 includes the light emitting element, the second pixel PX2 may emit light in response to the second driving signals DRS2. When the second pixel PX2 does not include the light emitting element, the second pixel PX2 might not emit light, but the second pixel PX2 may be formed so that the current I_PX2 corresponding to the second driving signals DRS2 may flow.

In an embodiment, the second pixel PX2 may include a second structure (for example, a second pixel circuit PXC2 of FIG. 5) having a structure substantially the same as that of a first pixel circuit (for example, a first pixel circuit PXC1 of FIG. 3) included in each of the first pixels PX1. In an embodiment, the second pixel PX2 may have a second pixel circuit (for example, a second pixel circuit PXC2' of FIG. 6) having a structure different from that of the first pixel circuit included in each of the first pixels PX1.

In an embodiment, the second pixel PX2 may be continuously driven by the second driving signals DRS2 during a display period in which the first pixels PX1 are driven. In an embodiment, the second pixel PX2 may be driven with a grayscale voltage corresponding to the highest grayscale by the second driving signals DRS2 during the display period (a remaining period of the display period except for a sensing period when the display period and the sensing period overlap). Accordingly, the second pixel PX2 may be degraded in a degree similar to that of the first pixels PX1 or more severely than the first pixels PX1.

The second pixel PX2 may be driven with at least one grayscale voltage corresponding to at least one reference grayscale (for example, a plurality of reference grayscales) during each sensing period. Accordingly, a current I_PX2 corresponding to the at least one reference grayscale may flow through the second pixel PX2 during each sensing period. During each sensing period, the second pixel PX2 may be connected to a readout circuit 620 of the sensor 600. Accordingly, the sensor 600 may sense the current I_PX2 flowing through the second pixel PX2 during each sensing period. The sensing period may be executed periodically, conditionally, and/or regularly every predetermined period and/or whenever a predetermined condition is satisfied.

The scan driver 200 may receive scan driving signals SCS from the timing controller 700. The scan driving signals SCS may include a sampling signal and/or timing signals necessary for driving the scan driver 200. The scan driver 200 may supply the respective scan signals to the scan lines SL based on the scan driving signals SCS.

Each scan signal may have a gate-on voltage capable of turning on a transistor to which the scan signal is supplied. For example, a scan signal of a low level may be supplied to a P-type transistor, and a scan signal of a high level may be supplied to an N-type transistor. Accordingly, the transistor receiving each scan signal may be turned on in response to the scan signal.

The emission driver 300 may receive emission driving signals ECS from the timing controller 700. The emission driving signals ECS may include a sampling signal and/or timing signals necessary for driving the emission driver 300. The emission driver 300 may supply the respective emission control signals to the emission control lines ECL based on the emission driving signals ECS. For example, the emission driver 300 may sequentially supply the emission control signals to the emission control lines ECL based on the emission driving signals ECS.

Each emission control signal may have a gate-off voltage capable of turning off a transistor to which the emission control signal is supplied. For example, an emission control signal of a high level may be supplied to a P-type transistor, and an emission control signal of a low level may be supplied to an N-type transistor. Accordingly, the transistor receiving each emission control signal may be turned off in response to the emission control signal and maintain an off state during a period in which the emission control signal is supplied.

FIG. 1 shows an embodiment in which the scan driver 200 and the emission driver 300 are provided as distinct elements, but embodiments are not necessarily limited thereto. For example, the scan driver 200 and the emission driver 300 may be integrated into one driving circuit, one module, or the like.

The data driver 400 may receive data driving signals DCS and compensated image data CDT (hereinafter, referred to as "second image data CDT") from the timing controller 700. The data driving signals DCS may include a sampling signal and/or timing signals necessary for driving the data driver 400. The data driver 400 may supply the respective data signals to the data lines DL based on the data driving signals DCS and the second image data CDT. For example, the data driver 400 may generate data signals having analog data voltages corresponding to respective grayscale values included in the second image data CDT supplied as digital data and output the data signals to the respective data lines DL. The data signals output to the data lines DL may be supplied to each of the first pixels PX1.

The power voltage generator 500 may receive power driving signals PCS from the timing controller 700. The power voltage generator 500 may generate driving voltages of the first pixels PX1 and the second pixel PX2 based on the power driving signals PCS and supply the driving voltages to the display panel 100 through respective power lines. In an embodiment, the power voltage generator 500 may be a power management integrated circuit (PMIC) or may include a PMIC.

In an embodiment, the power voltage generator 500 may generate the first power voltage VDD, the second power voltage VSS, the reference power voltage VREF, and the initialization power voltage VINT and supply the first power voltage VDD, the second power voltage VSS, the reference power voltage VREF, and the initialization power voltage VINT to the display panel 100. The first power voltage VDD and the second power voltage VSS may be supplied to the first pixels PX1 and the second pixel PX2. The reference power voltage VREF and the initialization power voltage VINT may be supplied to the first pixels PX1 and may be selectively supplied to the second pixel PX2 according to a structure of the second pixel PX2.

The sensor 600 may be electrically connected to the second pixel PX2 to sense the current I_PX2 flowing through the second pixel PX2 for each sensing period. For example, the sensor 600 may periodically sense the current I_PX2 of the second pixel PX2 to generate sensing data SDT corresponding to each sensing period. In an embodiment, the sensor 600 may receive the sensor driving signals SES from the timing controller 700 and generate the second driving signals DRS2 necessary for driving the second pixel PX2 in response to the sensor driving signals SES.

In an embodiment, the sensor 600 may include a signal generator 610 and the readout circuit 620.

The signal generator 610 may receive the sensor driving signals SES from the timing controller 700 and generate the second driving signals DRS2 necessary for driving the second pixel PX2 in response to the sensor driving signals SES. For example, the signal generator 610 may receive the sensor driving signals SES of a digital form, generate the second driving signals DRS2 having respective analog voltages corresponding to the sensor driving signals SES, and supply the second driving signals DRS2 to the second pixel PX2. In an embodiment, the signal generator 610 may include a level shifter for converting the sensor driving signals SES of a digital form into the second driving signals DRS2 of an analog form.

In an embodiment, when the second driving signals DRS2 are generated by the scan driver 200, the emission driver 300, and/or the data driver 400, the second pixel PX2 may be electrically connected to the scan driver 200, the emission driver 300, and/or the data driver 400, and the signal generator 610 may be omitted. For example, according to an embodiment, the sensor 600 may include only the readout circuit 620 and might not include the signal generator 610.

The readout circuit 620 may be electrically connected to the second pixel PX2 and sense the current I_PX2 of the second pixel PX2 for each sensing period. The readout circuit 620 may generate the sensing data SDT corresponding to the current I_PX2 of the second pixel PX2 and output the sensing data SDT to the degradation compensator 710. For example, the readout circuit 620 may include an analog-to-digital converter (ADC) for generating the sensing data SDT of a digital form corresponding to the current I_PX2 of the second pixel PX2. The readout circuit 620 may selectively further include an amplifier for amplifying the current I_PX2 of the second pixel PX2.

The timing controller 700 may receive the first image data IDT and timing control signals TCS from a host system (for example, an application processor (AP)) through an interface. The timing control signals TCS may include synchronization signals such as a vertical synchronization signal and a horizontal synchronization signal, a data enable signal, a clock signal, and the like.

The timing controller 700 may generate the scan driving signals SCS, the emission driving signals ECS, the data driving signals DCS, the power driving signals PCS, and the sensor driving signals SES based on the timing control signals TCS. The scan driving signals SCS, the emission driving signals ECS, the data driving signals DCS, the power driving signals PCS, and the sensor driving signals SES may be supplied to the scan driver 200, the emission driver 300, the data driver 400, the power voltage generator 500, and the sensor 600, respectively. In addition, the timing controller 700 may also output a control signal (for example, a switch control signal CS_SW of FIG. 5 or FIG. 6 or a digital signal corresponding thereto) for connecting the second pixel PX2 to the readout circuit 620 of the sensor 600 for each sensing period.

The timing controller 700 may rearrange the first image data IDT to match a specification of the display device 10. In an embodiment, the timing controller 700 may include the degradation compensator 710 and may convert the first image data IDT into the second image data CDT. In an embodiment, the degradation compensator 710 may be provided as a configuration separated from the timing controller 700.

The degradation compensator 710 may generate the second image data CDT by converting the first image data IDT to compensate for degradation according to a use amount of the first pixels PX1. The second image data CDT may be supplied to the data driver 400. The data driver 400 may generate the data signals based on the second image data CDT and supply the generated data signals to the first pixels PX1. Accordingly, the first pixels PX1 may be driven by the data signals corresponding to the second image data CDT converted to compensate for degradation, and thus a characteristic reduction (for example, reduction of a current and a luminance) due to the degradation of the first pixels PX1 may be compensated for. Accordingly, image quality of the display device 10 may be preserved and reliability of the display device 10 may be increased.

The degradation compensator 710 may convert the first image data IDT into the second image data CDT based on representative compensation data stored in a memory (for example, data stored in a form of a lookup table in which each of compensation values corresponding to a representative current curve modeled in a sample display device is stored for each age and reference grayscale), an age of the first pixels PX1 calculated according to the use amount of the first pixels PX1, and the sensing data SDT supplied from the sensor 600 during each sensing period. For example, the degradation compensator 710 may calculate the age according to the use amount of the first pixels PX1, and generate the second image data CDT by converting the first image data IDT by applying each of compensation values (for example, compensation values stored in a form of grayscale variation amount or a voltage variation amount for changing grayscale values or voltage values corresponding to the grayscale values of the first image data IDT) derived from the representative compensation data according to the age of the first pixels PX1.

In addition, the degradation compensator 710 may calibrate the representative compensation data based on the sensing data SDT input from the sensor 600 during each sensing period. The representative compensation data may include an age before shipment of the display device 10 and compensation values stored for each at least one reference grayscale according to a degradation characteristic of modeled pixels based on a characteristic change of the second pixel PX2 of the same sample display device as the display device 10. In describing embodiments of the present disclosure, the term "pixel(s)" may be a term inclusively referring to the first pixel(s) PX1 and the second pixel PX2.

The representative compensation data may be calibrated and/or updated to be suitable for an actual degradation characteristic of pixels provided to the display device 10 based on the sensing data SDT derived from the second pixel PX2 of the display device 10 after actual use of the display device 10. For example, the degradation compensator 710 may calibrate the compensation values of the age corresponding to each sensing period among compensation values included in the representative compensation data according to the calibration values derived from the sensing data SDT to update the representative compensation data in real time by reflecting the degradation characteristic of the corresponding display device 10. Accordingly, the degradation of the first pixels PX1 may be more accurately and/or effectively compensated for according to the degradation characteristic of each display device 10.

Figure 2:
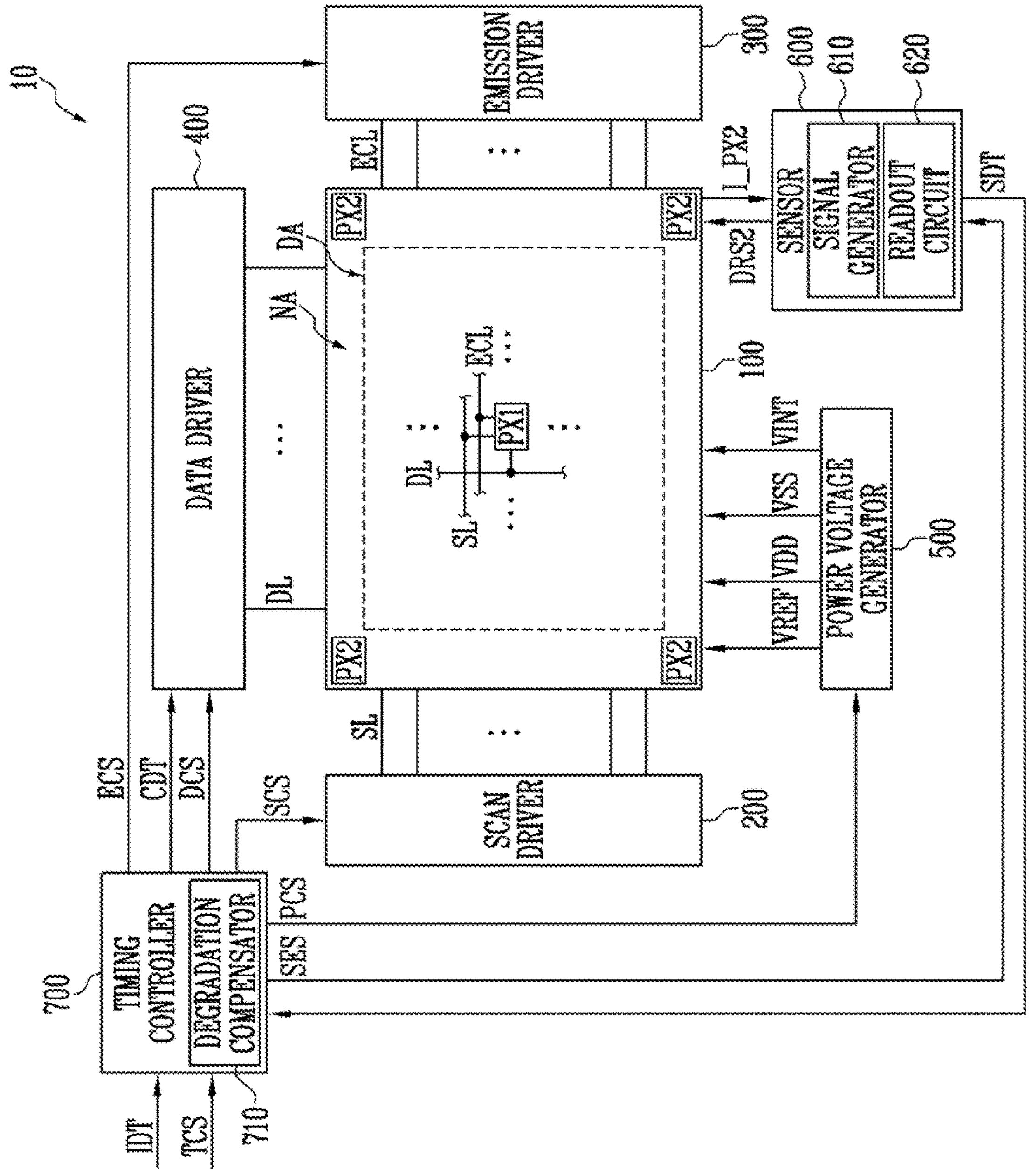
FIG. 2 is a block diagram illustrating a display device according to an embodiment of the present disclosure.

FIG. 2 is a block diagram illustrating a display device 10 according to an embodiment of the present disclosure. For example, FIG. 2 shows a particulate configuration for the second pixel PX2. In describing the embodiment of FIG. 2, the same reference numerals may be given to configurations similar to or identical to those of the embodiment of FIG. 1, and to the extent that a detailed description of one or more elements has been omitted, it may be assumed that those elements are at least similar to corresponding elements that have been described elsewhere within the present disclosure.

Referring to FIG. 2, the display device 10 may include at least two second pixels PX2 disposed around the first pixels PX1. For example, the display device 10 may include the second pixels PX2 disposed in the non-display area NA and positioned at different edge areas of the display panel 100. In FIG. 2, an embodiment in which one second pixel PX2 is disposed in each of corner areas of the display panel 100 is discloses, but the number and/or a position of second pixels PX2 disposed in the display panel 100 may be variously changed. For example, in an embodiment, two second pixels PX2 may be disposed at opposite ends of an upper edge area of the display panel 100, and one second pixel PX2 may be disposed between the two second pixels PX2. Similarly, two second pixels PX2 may be disposed at opposite ends of a lower edge area of the display panel 100, and one second pixel PX2 may be disposed between the two second pixels PX2. In such a method, a total of six second pixels PX2 may be disposed in the display panel 100. The number and/or the position of the second pixels PX2 may be changed to another form.

According to an embodiment, two or more second pixels PX2 may be disposed in each of corner area of the display panel 100. For example, in each of the corner areas of the display panel 100, the second pixels PX2 of the number corresponding to types (for example, a first color pixel, a second color pixel, and a third color pixel) of the first pixels PX1 configuring each unit pixel. Alternatively, the second pixels PX2 corresponding to the types of the first pixels PX1 configuring each unit pixel may be disposed in different corner areas of the display panel 100.

In an embodiment, the second pixels PX2 may be driven independently of each other. For example, the second pixels PX2 may be driven simultaneously or sequentially by the sensor 600. In addition, the second pixels PX2 may be simultaneously or sequentially connected to the readout circuit 620 of the sensor 600 for each sensing period.

The sensor 600 may individually sense a current flowing through each of the second pixels PX2 for each sensing period to generate the sensing data SDT corresponding to each of the second pixels PX2. The sensing data SDT may be supplied to the degradation compensator 710.

The degradation compensator 710 may individually store the representative compensation data corresponding to each of the second pixels PX2 and individually calibrate the representative compensation data corresponding to each of the second pixels PX2 for each sensing period. For example, when a total of four second pixels PX2 are disposed in the display panel 100, the degradation compensator 710 may include four lookup tables periodically calibrated according to each sensing data SDT corresponding to any one second pixel PX2.

In each lookup table, compensation values for compensating for a current and/or a luminance degradation due to a degradation characteristic extracted from the second pixels PX2 of the sample display device before shipment of the display device 10 may be individually stored. In addition, the representative compensation data stored in each lookup table may periodically calibrated and/or updated based on the sensing data SDT corresponding to the current I_PX2 sensed from the second pixel PX2 corresponding to the representative compensation data of the lookup table for each sensing period.

In addition, the representative compensation data stored in each lookup table may be used to compensate for the degradation of the first pixels PX1 adjacent to the second pixel PX2 corresponding to the representative compensation data of the lookup table. For example, the display area DA is divided into at least two blocks (for example, second blocks BLK2 of FIG. 14) based on the second pixels PX2, and each second pixel PX2 may be matched with the first pixels PX1 of an adjacent block.

For example, when the second pixels PX2 are disposed in different edge areas of the display panel 100, the first pixels PX1 may be grouped in response to each of blocks to correspond to any one adjacent second pixel PX2 among the second pixels PX2. The degradation compensator 710 may convert data corresponding to the first pixels PX1 of a corresponding group among the first image data IDT by applying the compensation values of the representative compensation data calibrated based on the sensing data SDT corresponding to the any one adjacent second pixel PX2 with respect to the first pixels PX1 of each group. For example, when one second pixel PX2 is disposed in each of the four corner areas of the display panel 100, the display area DA may be divided into four blocks of 2*2 (two-by-two), and the first image data IDT corresponding to the first pixels PX1 belonging to each block may be converted into the second image data CDT using the representative compensation data calibrated based on the current I_PX2 sensed from the second pixel PX2 adjacent to a corresponding block.

In the method described above, the display area DA may be divided into at least two blocks (or sub-areas corresponding thereto) using at least two second pixels PX2, and the degradation of the first pixels PX1 may be compensated for by applying the compensation value of the representative compensation data calibrated based on the current I_PX2 sensed from the second PX2 adjacent to each block. In this case, the degradation of the first pixels PX1 may be more accurately and/or precisely compensated for according to a degradation characteristic for each position of the first pixels PX1.

In an embodiment, the degradation compensator 710 may store respective representative compensation data in a form of lookup tables corresponding to each of the second pixels PX2. For example, each representative compensation data may include degradation compensation values capable of compensating for the characteristic change according to the degradation of the second pixel PX2 sensed for each age and reference grayscale with respect to the corresponding second pixel PX2. The compensation values stored in each of the lookup tables may be calibrated for each age and/or reference grayscale based on the sensing data SDT corresponding to each of the second pixels PX2 for each sensing period and may be used for converting the first image data IDT1. Compensation value for the age and/or the grayscales, which is not stored in the lookup tables may be derived from the compensation values of the lookup tables through an interpolation method.

At least two second pixels PX2 may be disposed in the display panel 100 as in the above-described embodiment, and the representative compensation data corresponding to each of the second pixels PX2 may be individually calibrated and/or updated based on the current I_PX2 sensed from each of the second pixels PX2. In this case, the degradation of the first pixels PX1 may be more precisely compensated for by reflecting the degradation characteristic according to the position or the like of the first pixels PX1.

Figure 3:
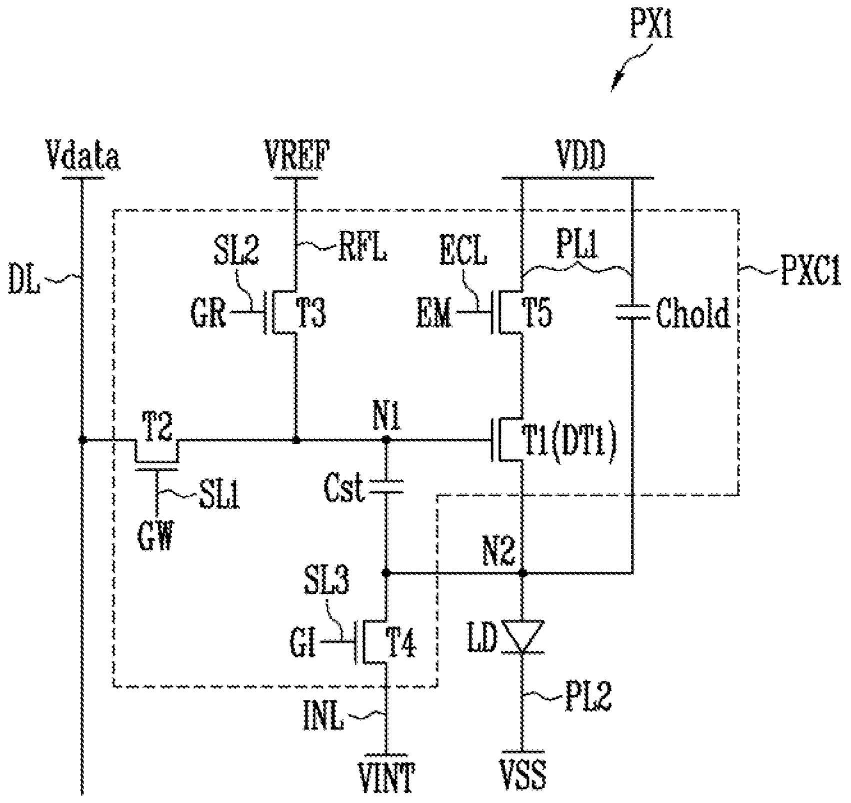
FIG. 3 is a circuit diagram illustrating a first pixel according to an embodiment of the present disclosure.

FIG. 3 is a circuit diagram illustrating a first pixel PX1 according to an embodiment of the present disclosure. According to an embodiment, the first pixel PX1 of FIG. 3 may be one of the first pixels PX1 included in the display device 10 of FIG. 1 or 2. The first pixels PX1 may have structures substantially similar or identical to each other.

Referring to FIGS. 1 to 3, the first pixel PX1 may be connected to signal lines provided to a corresponding horizontal line and a corresponding vertical line. For example, the first pixel PX1 may be connected to at least one scan line SL and emission control line ECL disposed on a corresponding horizontal line and a data line DL disposed on a corresponding vertical line. In an embodiment, the first pixel PX1 may be connected to a first scan line SL1, a second scan line SL2, a third scan line SL3, and the emission control line ECL of the corresponding horizontal line, and the data line DL of the corresponding vertical line (one of the data lines DL when at least two data lines DL corresponding to the first pixels PX1 of different colors are disposed on the corresponding vertical line).

The first pixel PX1 may be further connected to power lines. For example, the first pixel PX1 may be connected to the first power line PL1 and the second power line PL2. In an embodiment, the first pixel PX1 may be further connected to the reference power line RFL and the initialization power line INL.

The first pixel PX1 may include a first pixel circuit PXC1 and a light emitting element LD connected to the first pixel circuit PXC1. The first pixel circuit PXC1 may include a first transistor T1 (also referred to as a "first driving transistor DT1"), a second transistor T2 (also referred to as a "first switching transistor"), and a first capacitor Cst (also referred to as a "storage capacitor"). In an embodiment, the first pixel circuit PXC1 may include a third transistor T3 (also referred to as a "second switching transistor"), a fourth transistor T4 (also referred to as a "third switching transistor"), and a fifth transistor T5 (also referred to as a "fourth switching transistor"), and a second capacitor Chold (also referred to as a "holding capacitor").

The first pixel PX1 may be driven by the first driving signals DRS1 and the driving voltages. The first driving signals DRS1 may include a first scan signal GW and a data signal (for example, a data voltage Vdata). In an embodiment, the first driving signals DRS1 may further include a second scan signal GR, a third scan signal GI, and/or an emission control signal EM. The driving voltages may include the first power voltage VDD and the second power voltage VSS. In an embodiment, the driving voltages may further include the reference power voltage VREF and/or the initialization power voltage VINT.

The first transistor T1 may be connected between the first power line PL1 and a second node N2. For example, a first electrode of the first transistor T1 may be connected to the first power line PL1 through a fifth transistor T5, and a second electrode of the first transistor T1 may be connected to the second node N2. The first power line PL1 may be a power line to which the first power voltage VDD is applied. The second node N2 may be a node between the first transistor T1 and the light emitting element LD. A gate electrode of the first transistor T1 may be connected to a first node N1.

The first transistor T1 may supply a driving current to the light emitting element LD. For example, the first transistor T1 may supply a driving current corresponding to the first node N1 to the light emitting element LD.

In an embodiment, the first transistor T1 may further include a bottom gate to aid an operation characteristic. For example, the bottom gate of the first transistor T1 may be connected between the second capacitor Chold and the second node N2.

The second transistor T2 may be connected between the data line DL and the first node N1. A gate electrode of the second transistor T2 may be connected to the first scan line SL1.

The second transistor T2 may be turned on in response to the first scan signal GW supplied to the first scan line SL1. When the second transistor T2 is turned on, the data signal supplied to the data line DL may be transferred to the first node N1.

The third transistor T3 may be connected between the reference power line RFL and the first node N1. The reference power line RFL may be a power line to which the reference power voltage VREF is applied. A gate electrode of the third transistor T3 may be connected to the second scan line SL2.

The third transistor T3 may be turned on in response to the second scan signal GR supplied to the second scan line SL2. When the third transistor T3 is turned on, the reference power voltage VREF may be transferred to the first node N1.

The fourth transistor T4 may be connected between the second node N2 and the initialization power line INL. The initialization power line INL may be a power line to which the initialization power voltage VINT is applied. A gate electrode of the fourth transistor T4 may be connected to the third scan line SL3.

The fourth transistor T4 may be turned on in response to the third scan signal GI supplied to the third scan line SL3. When the fourth transistor T4 is turned on, the initialization power voltage VINT may be transferred to the second node N2.

The fifth transistor T5 may be connected between the first power line PL1 and the first transistor T1. A gate electrode of the fifth transistor T5 may be connected to the emission control line ECL.

The fifth transistor T5 may be turned off in response to the emission control signal EM supplied to the emission control line ECL. When the fifth transistor T5 is turned off, a current path through which the driving current may flow may be blocked in the first pixel PX1, and thus the driving current might not be supplied to the light emitting element LD.

The first to fifth transistors T1 to T5 may be N-type transistors, but embodiments are not necessarily limited thereto. For example, at least one of the first to fifth transistors T1 to T5 may be changed to a P-type transistor. A signal level (for example, a voltage level) of the first driving signal DRS1 for controlling driving of the transistor may be set according to a type of each transistor.

The first capacitor Cst may be connected between the first node N1 and the second node N2. A voltage corresponding to the data signal may be stored in the first capacitor Cst.

The second capacitor Chold may be connected between the first power line PL1 and the second node N2. The second capacitor Chold may stabilize a voltage of the second node N2.

The light emitting element LD may be connected between the second node N2 and the second power line PL2. For example, the light emitting element LD may be connected in a forward direction between the second node N2 and the second power line PL2. The second power line PL2 may be a power line to which the second power voltage VSS is applied. When the driving current is supplied from the first transistor T1, the light emitting element LD may emit light with a luminance corresponding to the driving current.

In an embodiment, the light emitting element LD may include an organic light emitting diode. In an embodiment, the light emitting element LD may include at least one inorganic light emitting diode. A type, a size, and/or the number of the light emitting elements LD may be changed according to an embodiment.

In an embodiment, at least one transistor provided in the first pixel PX1 may be an oxide semiconductor transistor. For example, at least one transistor including the first transistor T1 may be an oxide semiconductor transistor including an oxide semiconductor.

When the first transistor T1 is the oxide semiconductor transistor, an operation speed of the first pixel PX1 may be increased. However, when the first transistor T1 is the oxide semiconductor transistor, even though a threshold voltage of the first transistor T1 is offset and/or compensated for inside the first pixel PX1, a driving current and a luminance generated by the first transistor T1 may be decreased with respect to the same grayscale voltage as time elapses due to a performance reduction according to the degradation of the first transistor T1. In embodiments of the present disclosure, the degradation of the first pixels PX1 may be compensated for by the degradation compensator 710, thereby preventing the luminance of the first pixels PX1 from being decreased and preserving the display quality of the display device 10.

Figure 4:
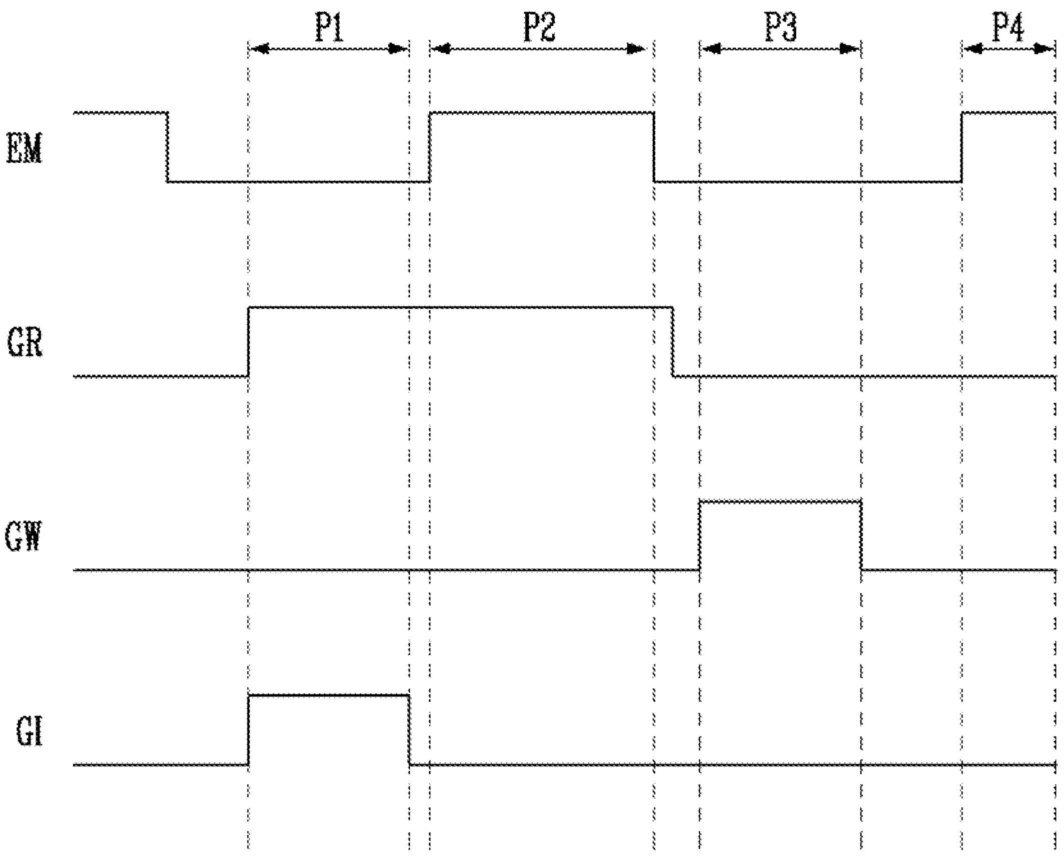
FIG. 4 is a waveform diagram illustrating first driving signals supplied to the first pixel PX1 of FIG. 3.

FIG. 4 is a waveform diagram illustrating the first driving signals DRS1 supplied to the first pixel PX1 of FIG. 3. For example, FIG. 4 illustrates an example of the first scan signal GW, the second scan signal GR, the third scan signal GI, and the emission control signal EM that control an operation timing of the first pixel PX1. In an embodiment, the first pixels PX1 disposed on the same horizontal line in the display area DA of FIG. 1 or 2 may be simultaneously driven. The first pixels PX1 disposed on different horizontal lines may be sequentially driven in response to each of horizontal period.

Referring to FIGS. 3 and 4, a method of driving the first pixel PX1 according to an embodiment of the present disclosure may include an initialization step, a threshold voltage compensation step, a data write step, and an emission step.

The initialization step may be performed during a first period P1. In the initialization step, the fourth transistor T4 may be turned on to supply the initialization power voltage VINT to the second node N2. To this end, a third scan signal GI of a gate-on voltage may be supplied to the third scan line SL3 during the first period P1.

In addition, in the initialization step, the third transistor T3 may be turned on together to supply the reference power voltage VREF to the first node N1. To this end, a second scan signal GR of a gate-on voltage may be supplied together to the second scan line SL2 during the first period P1.

In addition, in the initialization step, the fifth transistor T5 may be turned off to block generation of the driving current by the first transistor T1. To this end, an emission control signal EM of a gate-off voltage may be supplied to the emission control line ECL during the first period P1.

Through the above-described initialization operation, the first pixel PX1 may be initialized so as not to be affected by a data signal supplied in a previous unit period (for example, a previous frame period).

At this time, a voltage of the first node N1 and a voltage of the second node N2 may be the same as in Equation 1 below.

$$VN1=VREF$$

$$VN2=VINT \qquad \text{[Equation 1]}$$

(Here, VN1 is the voltage of the first node N1, VREF is the reference power voltage, VN2 is the voltage of the second node N2, and VINT is the initialization power voltage)

The threshold voltage compensation step may be performed during a second period P2. In the threshold voltage compensation step, the third transistor T3 and the fifth transistor T5 may be turned on to store the threshold voltage of the first transistor T1 in the first capacitor Cst.

To this end, during the second period P2, a second scan signal GR of a gate-on voltage may be supplied to the second scan line SL2 and an emission control signal EM of a gate-on voltage may be supplied to the emission control line ECL.

Accordingly, during the second period P2, the third transistor T3 may maintain an on state and the fifth transistor T5 may be turned on.

During the second period P2, the voltage of the first node N1 may be maintained as the reference power voltage VREF, and the voltage of the second node N2 may be changed from the initialization power voltage VINT to a value obtained by subtracting the threshold voltage of the first transistor T1 from the reference power voltage VREF.

At this time, the voltage of the first node N1 and the voltage of the second node N2 may be the same as in Equation 2 below.

$$VN1=VREF$$

$$VN2=VREF-Vth1 \qquad \text{[Equation 2]}$$

(Here, VN1 is the voltage of the first node N1, VREF is the reference power voltage, VN2 is the voltage of the second node N2, and Vth1 is the threshold voltage of the first transistor T1).

Meanwhile, to maintain the light emitting element LD in a non-emission state during the threshold voltage compensation step, the reference power voltage VREF may be set to a voltage level capable of maintaining the light emitting element LD in the non-emission state.

A duration of the threshold voltage compensation step (for example, a duration of the second period P2) may be determined by the second scan signal GR and the emission control signal EM. For example, the duration of the threshold voltage compensation step may be adjusted by adjusting widths of the second scan signal GR and the emission control signal EM of the gate-on voltage.

The data write step may be performed during a third period P3. In the data write step, the data signal may be supplied to the first node N1 by turning on the second transistor T2. For example, in the data write step, the data signal transferred from the data line DL may be supplied to the first node N1 via the second transistor T2.

To this end, a first scan signal GW of a gate-on voltage may be supplied to the first scan line SL1 during the third period P3. Accordingly, during the third period P3, the first transistor T1 may maintain an on state, and the third transistor T3, the fourth transistor T4, and the fifth transistor T5 may maintain an off state.

During the third period P3, the voltage of the first node N1 may be maintained as the voltage of the data signal (for example, the data voltage Vdata). During the third period P3, the voltage of the first node N1 and the voltage of the second node N2 may be the same as in Equation 3 below.

$$VN1=Vdata$$

$$VN2=VREF-Vth1 \qquad \text{[Equation 3]}$$

(Here, VN1 is the voltage of the first node N1, Vdata is the data voltage, VREF is the reference power voltage, VN2 is the voltage of the second node N2, and Vth1 is the threshold voltage of the first transistor T1)

Additionally, the second node N2 maintains the voltage VREF-Vth1 during the third period P3 in Equation 3 for convenience of description, embodiments are not necessarily limited thereto.

For example, during the third period P3, the first node N1 may be changed from the reference power voltage VREF to the data voltage Vdata, and the voltage of the second node N2 may be changed in response to a voltage change amount of the first node N1 by coupling of the first capacitor. However, in an embodiment of the present disclosure, a capacitance of the second capacitor Chold may be set to be greater than a capacitance of the first capacitor Cst, and thus a voltage change amount of the second node N2 may be minimized during the third period P3. Hereinafter, for convenience of description, it is assumed that the second node N2 maintains the voltage VREF-Vth1 during the third period P3.

Finally, the emission step may be performed during a fourth period P4. In the emission step, the driving current corresponding to the voltage stored in the first capacitor Cst may be supplied to the light emitting element LD by the first transistor T1.

To this end, the scan signals GW, GR, and GI of the gate-on voltage might not be supplied to the first, second, and third scan lines SL1, SL2, and SL3 during the fourth period P4. For example, voltages of the first, second, and third scan lines SL1, SL2, and SL3 during the fourth period P4 may be gate-off voltages. During the fourth period P4, the emission control signal EM of the gate-off voltage might not be supplied to the emission control line ECL. For example, the voltage of the emission control line ECL during the fourth period P4 may be a gate-on voltage. Accordingly, the fifth transistor T5 may be turned on.

The voltage of the first node N1 and the voltage of the second node N2 during the fourth period P4 may be the same as in Equation 4 below. Accordingly, the first transistor T1 may supply the driving current according to Equation 4 below to the light emitting element LD.

$$Ild = k\left(\frac{Cst}{Cst + Chold + Cld}(Vgs - Vth1)\right)^2 = k\left(\frac{Cst}{Cst + Chold + Cld}(Vdata - VREF)\right)^2 \quad \text{[Equation 4]}$$

$$VN2 = Vld$$

$$VN1 = Vdata + (Vld - VREF + Vth1)$$

(Here, VN1 is the voltage of the first node N1, Vdata is the data voltage, Vld is the voltage of the second node N2, VREF is the reference power voltage, Vth1 is the threshold voltage of the first transistor T1, VN2 is the voltage of the second node N2 (for example, an anode voltage), Ild is the driving current generated by the first transistor T1, k is a constant, Vgs is a gate-source voltage of the first transistor T1, Cst is the capacitance of the first capacitor, Chold is the capacitance of the second capacitor, Cld is a parasitic capacitance formed in the light emitting element).

The threshold voltage Vth1 of the first transistor T1 may be offset from Equation 4. Accordingly, a luminance non-uniformity phenomenon due to a threshold voltage deviation of a first driving transistors DT1, for example, the first transistors T1, included in the first pixels PX1.

However, according to a degradation characteristic of the first transistor T1, even though the threshold voltage of the first transistor T1 is compensated for in the first pixel PX1, the driving current Ild generated by the first transistor may be decreased with respect to the same grayscale voltage as time elapses due to a performance reduction according to the degradation of the first transistor T1. For example, when the first transistor T1 is an oxide semiconductor transistor, as time elapses, the first transistor T1 may be degraded and the driving current Ild flowing through the first pixel PX1 may decrease. For example, as a use amount of the first pixel PX1 increases, the first transistor T1 may be degraded, and thus the driving current Ild flowing through the first pixel PX1 and a luminance may gradually decrease. Therefore, in embodiments of the present disclosure, the first pixels PX1 may be formed as internal compensation pixels to compensate for the threshold voltages Vth1 of each of the first transistors T1 in each of the first pixels PX1, and the first image data IDT may be converted into the second image data CDT so that the degradation of the first pixels PX1 may be compensated for, based on the degradation characteristic derived from at least one second pixel PX2 formed in the display panel 100 together with the first pixels PX1. Accordingly, the degradation of the first pixels PX1 may be more accurately predicted and compensated for.

Figure 5:
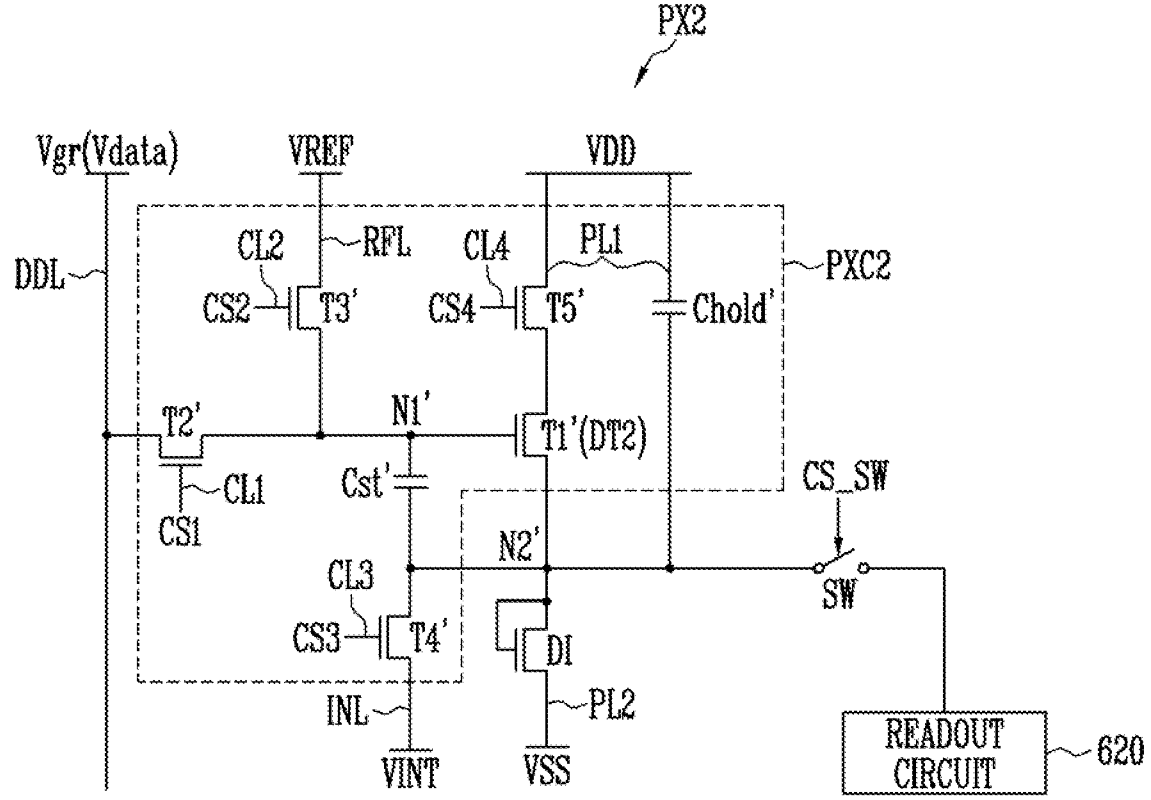
FIG. 5 is a circuit diagram illustrating a second pixel according to an embodiment of the present disclosure.

FIG. 5 is a circuit diagram illustrating a second pixel PX2 according to an embodiment of the present disclosure. According to an embodiment, the second pixel PX2 of FIG. 5 may be the second pixel PX2 provided in the display device 10 of FIG. 1 or 2. The display device 10 may include at least one second pixel PX2.

Referring to FIGS. 1 to 5, the second pixel PX2 may be connected to at least one control line CL and the dummy data line DDL. In an embodiment, the second pixel PX2 may be connected to a first control line CL1, a second control line CL2, a third control line CL3, a fourth control line CL4, and the dummy data line DDL.

The second pixel PX2 may be further connected to power lines. For example, the second pixel PX2 may be connected to the first power line PL1 and the second power line PL2. In an embodiment, the second pixel PX2 may be further connected to the reference power line RFL and the initialization power line INL.

In an embodiment, the second pixel PX2 may include a second pixel circuit PXC2 and a non-light emitting diode DI (for example, a non-light emitting diode having a structure in which a transistor is diode-connected in a forward direction) connected to the second pixel circuit PXC2. In an embodiment, the second pixel PX2 may include the second pixel circuit PXC2 and a light emitting element (for example, a light emitting element of the same type and/or structure as the light emitting elements LD of the first pixels PX1) connected to the second pixel circuit PXC2.

In an embodiment, a structure of the second pixel circuit PXC2 may be substantially the same as or similar to that of the first pixel circuit PXC1. For example, the second pixel circuit PXC2 may include a first transistor T1' (also referred to as a "second driving transistor DT2"), a second transistor T2', a third transistor T3', a fourth transistor T4', a fifth transistor T5', a first capacitor Cst', and a second capacitor Chold' corresponding to the first transistor T1, the second transistor T2, the third transistor T3, the fourth transistor T4, the fifth transistor T5, the first capacitor Cst, and the second capacitor Chold of the first pixel circuit PXC1, respectively.

The second pixel PX2 may be driven by the second driving signals DRS2 and the driving voltages. The second driving signals DRS2 may include a first control signal CS1 and a grayscale voltage Vgr. In an embodiment, the second driving signals DRS2 may further include a second control signal CS2, a third control signal CS3, and/or a fourth control signal CS4. The driving voltages may include the first power voltage VDD and the second power voltage VSS. In an embodiment, the driving voltages may further include the reference power voltage VREF and/or the initialization power voltage VINT.

The first transistor T1' may be connected between the first power line PL1 and a second node N2'. For example, a first electrode of the first transistor T1' may be connected to the first power line PL1 through the fifth transistor T5', and a second electrode of the first transistor T1' may be connected to the second node N2'. The second node N2' may be a node between the first transistor T1' and the non-light emitting diode DI (or the light emitting element of the second pixel PX2). A gate electrode of the first transistor T1' may be connected to a first node N1'. The first transistor T1' may generate a driving current I_PX2 corresponding to a voltage of the first node N1'.

In an embodiment, the first transistor T1' may be a transistor of the same type, structure, and/or size as the first transistors T1 of the first pixels PX1 and may be formed simultaneously with the first transistors T1 of the first pixels PX1. For example, the first transistor T1' may be formed substantially identically to the first transistors T1 of the first pixels PX1. For example, the first transistor T1' may be an oxide semiconductor transistor substantially the same as the first transistors T1 of the first pixels PX1.

Accordingly, the first transistor T1' may exhibit a degradation characteristic substantially similar to or identical to that of the first transistors T1 of the first pixels PX1 (for example, first transistors T1 of adjacent first pixels PX1). Therefore, when a change or the like of the driving current I_PX2 and/or a luminance according to degradation of the first transistor T1' is detected, the driving current Ild and/or luminance change according to the degradation of the first transistors T1 of the first pixels PX1 at the same use amount (for example, the age) may be more accurately predicted.

The second transistor T2' may be connected between the dummy data line DDL and the first node N1'. A gate electrode of the second transistor T2 may be connected to the first control line CL1.

The second transistor T2' may be turned on in response to the first control signal CS1 supplied to the first control line CL1. When the second transistor T2' is turned on, the grayscale voltage Vgr supplied to the dummy data line DDL may be transferred to the first node N1'.

The third transistor T3' may be connected between the reference power line RFL and the first node N1'. A gate electrode of the third transistor T3' may be connected to the second control line CL2.

The third transistor T3' may be turned on in response to the second control signal CS2 supplied to the second control line CL2. When the third transistor T3' is turned on, the reference power voltage VREF may be transferred to the first node N1'.

The fourth transistor T4' may be connected between the second node N2' and the initialization power line INL. A gate electrode of the fourth transistor T4' may be connected to the third control line CL3.

The fourth transistor T4' may be turned on in response to the third control signal CS3 supplied to the third control line CL3. When the fourth transistor T4' is turned on, the initialization power voltage VINT may be transferred to the second node N2'.

The fifth transistor T5' may be connected between the first power line PL1 and the first transistor T1'. A gate electrode of the fifth transistor T5' may be connected to the fourth control line CL4.

The fifth transistor T5' may be turned off in response to a fourth control signal CS4 of a gate-off voltage supplied to the fourth control line CL4. When the fifth transistor T5' is turned off, a current path of the second pixel PX2 may be blocked, and thus the driving current I_PX2 might not be supplied to the non-light emitting diode DI.

The first to fifth transistors T1' to T5' may be N-type transistors, but embodiments are not necessarily limited thereto. For example, at least one of the first to fifth transistors T1' to T5' may be a P-type transistor. In an embodiment, the first to fifth transistors T1' to T5' of the second pixel PX2 may be formed substantially identically to the first to fifth transistors T1 to T5 of the first pixel PX1. Accordingly, the second pixel PX2 may exhibit a degradation characteristic substantially similar to or identical to that of the first pixels PX1.

The first capacitor Cst' may be connected between the first node N1' and the second node N2'. A voltage corresponding to the grayscale voltage Vgr may be stored in the first capacitor Cst'.

The second capacitor Chold' may be connected between the first power line PL1 and the second node N2'. The second capacitor Chold' may stabilize a voltage of the second node N2'.

The non-light emitting diode DI may be connected in the forward direction between the second node N2' and the second power line PL2. Accordingly, even though the second pixel PX2 does not emit light, the driving current I_PX2 generated by the first transistor T1' may flow through the non-light emitting diode DI.

In an embodiment, the second pixel PX2 may include a light emitting element formed together with the light emitting elements LD of the first pixels PX1 and may emit light by the driving current I_PX2 generated by the first transistor T1'. When recognition of the second pixel PX2 is not desired, the light generated by the second pixel PX2 may be blocked from being recognized by a user by using a light blocking layer or the like.

In an embodiment, the second driving signals DRS2 may have a waveform substantially identical to or similar to that of the first driving signals DRS1. For example, the first control signal CS1, the second control signal CS2, the third control signal CS3, and the fourth control signal CS4 may have waveforms substantially identical to or similar to those of the first scan signal GW, the second scan signal GR, the third scan signal GI, and the emission control signal EM, respectively. The grayscale voltage Vgr may be a data voltage Vdata corresponding to the highest grayscale and/or at least one reference grayscale (also referred to as an "observation grayscale").

However, the second driving signals DRS2 may be supplied separately from the first driving signals DRS1, and thus the first pixels PX1 and the second pixel PX2 may be independently driven. For example, the second driving signals DRS2 may be applied to the second pixel PX2 in both of the display period in which the first pixels PX1 are driven and the sensing period in which the current I_PX2 of the second pixel PX2 is sensed.

In an embodiment, the grayscale voltage Vgr of the highest grayscale corresponding to a maximum luminance (for example, a grayscale voltage corresponding to the highest grayscale set to express the maximum luminance in a red pixel, a green pixel, or a blue pixel) may be supplied to the second pixel PX2 during the display period in which the first pixels PX1 are driven (a remaining display period except for the sensing period when the display period and the sensing period overlap). Accordingly, the second pixel PX2 may be degraded to an extent that is beyond the first pixels PX1.

In an embodiment, the grayscale voltage Vgr corresponding to at least one reference grayscale may be supplied to the second pixel PX2 for each sensing period. For example, the grayscale voltages Vgr corresponding to a plurality of reference grayscales may be sequentially supplied to the second pixel PX2 during each sensing period.

The display device 10 may further include a switch SW connected between the readout circuit 620 of the sensor 600 and each of the second pixels PX2. The switch SW may be disposed on the display panel 100 together with the second pixel PX2 or disposed on a circuit board or the like together with the sensor 600. A position and a type of the switch SW are not necessarily limited. For example, the switch SW may be a built-in switch formed in the display panel 100 together with the first pixels PX1 and the second pixel PX2 or an external switch mounted on a circuit board or the like.

The switch SW may be turned on in response to a switch control signal CS_SW generated by the timing controller 700 and/or the signal generator 610. For example, the switch SW may be turned on by the switch control signal CS_SW for each sensing period. Accordingly, the second pixel PX2 may be connected to the readout circuit 620 during each sensing period. The readout circuit 620 may detect the current I_PX2 flowing through the second pixel PX2 in response to the grayscale voltage(s) Vgr corresponding to each reference grayscale(s) during each sensing period and generate the sensing data SDT corresponding to the detected current I_PX2. For example, the grayscale voltages Vgr corresponding to a plurality of reference grayscales may be sequentially supplied to the second pixel PX2 during each sensing period, and the current I_PX2 corresponding to each of the grayscale voltage Vgr may be sensed to obtain a sensing current curve according to a grayscale at a corresponding age. The sensing data SDT may be used to calibrate the representative compensation data stored in the degradation compensator 710.

Figure 6:
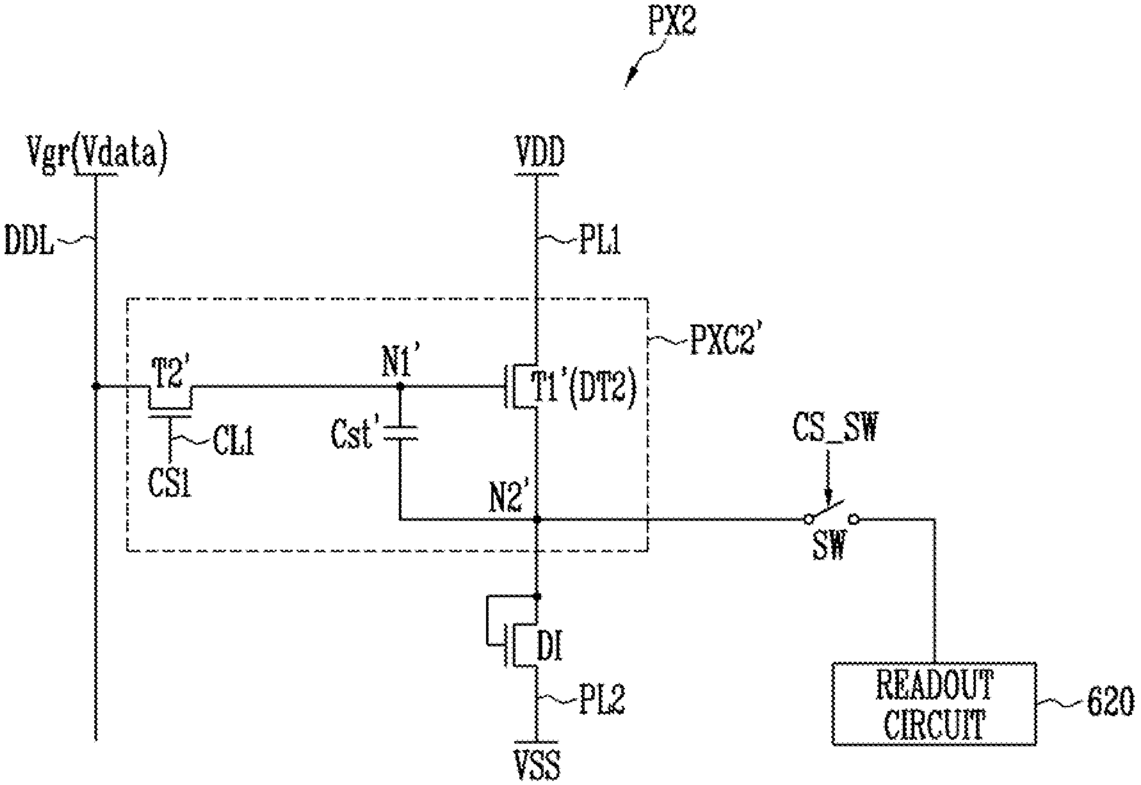
FIG. 6 is a circuit diagram illustrating a second pixel according to an embodiment of the present disclosure.

FIG. 6 is a circuit diagram illustrating a second pixel PX2 according to an embodiment of the present disclosure. According to an embodiment, the second pixel PX2 of FIG. 6 may be the second pixel PX2 provided in the display device 10 of FIG. 1 or 2. In describing the embodiment of FIG. 6, the same reference numerals are given to configurations similar to or identical to those of the embodiment of FIG. 5, and to the extent that a detailed description of one or more elements has been omitted, it may be assumed that those elements are at least similar to corresponding elements that have been described elsewhere within the present disclosure.

Referring to FIGS. 1 to 6, the second pixel PX2 may include a second pixel circuit PXC2' having a structure different from that of the first pixel circuit PXC1. For example, the first pixel circuit PXC1 may be configured of an internal compensation circuit capable of offsetting the threshold voltage Vth1 of the first transistor T1, and the second pixel circuit PXC2' might not include circuit elements for offsetting the threshold voltage of the first transistor T1'. As an example, the second pixel circuit PXC2' may include essential configurations (for example, the first transistor T1', the second transistor T2', and the first capacitor Cst') to generate the driving current I_PX2 in response to the grayscale voltage Vgr, and might not include at least one of the remaining configurations (for example, the third transistor T3', the fourth transistor T4', the fifth transistor T5', and/or the second capacitors Chold'). A structure of the second pixel PX2 and a driving method according thereto may be variously changed according to an embodiment.

According to an embodiment, in a method similar to that of the embodiment of FIG. 5, the grayscale voltage Vgr corresponding to the highest grayscale and at least one reference grayscale may be supplied to the second pixel PX2 during the display period and the sensing period, respectively. Accordingly, the second pixel PX2 may degraded to an extent that is beyond the first pixels PX1, and the current I_PX2 of the second pixel PX2 corresponding to each reference grayscale may be sensed during each sensing period.

Figure 7:
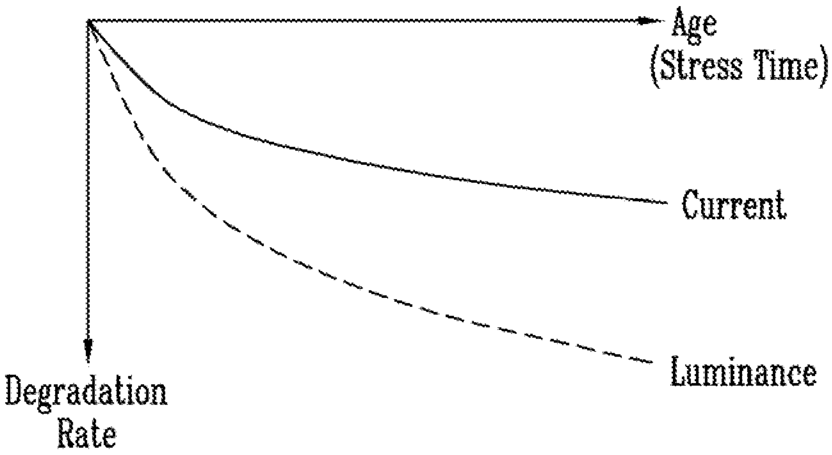
FIG. 7 is a graph schematically illustrating changes of a current and a luminance according to an age of a pixel according to an embodiment of the present disclosure.

FIG. 7 is a graph schematically illustrating changes of a current and a luminance according to an age of a pixel according to an embodiment of the present disclosure.

Referring to FIG. 7, as the age of the pixel (for example, each of the first pixel PX1 or the second pixel PX2) increases, the pixel may be degraded. The age may be an index indicating a use amount of the pixel and may correspond to a stress time based on accumulated data (or accumulated grayscale voltage). In addition, another factor such as a temperature, a characteristic, or the like of the driving transistor may be further reflected in the age. For example, the age of the pixel may be calculated by assigning an acceleration coefficient or weight based on information on a temperature of a panel, an initial threshold voltage of the driving transistor, or the like. In describing embodiments, the term "driving transistor(s)" may be a term inclusively referring to the first driving transistor(s) DT1 and the driving transistor(s) DT2.

As the pixel is degraded, a current flowing through each pixel with respect to the same data voltage Vdata (or the grayscale voltage Vgr) may gradually decrease. When the current flowing through the pixel decreases, the luminance of the pixel may also decrease.

Accordingly, in embodiments of the present disclosure, the change of the current and/or the luminance of the pixel is more accurately predicted and compensated for. For example, in embodiments, the current I_PX2 flowing through at least one second pixel PX2 provided in the display panel 100 may be periodically sensed, and the representative compensation data may be calibrated using the sensing data SDT generated according to the current I_PX2.

Figure 8:
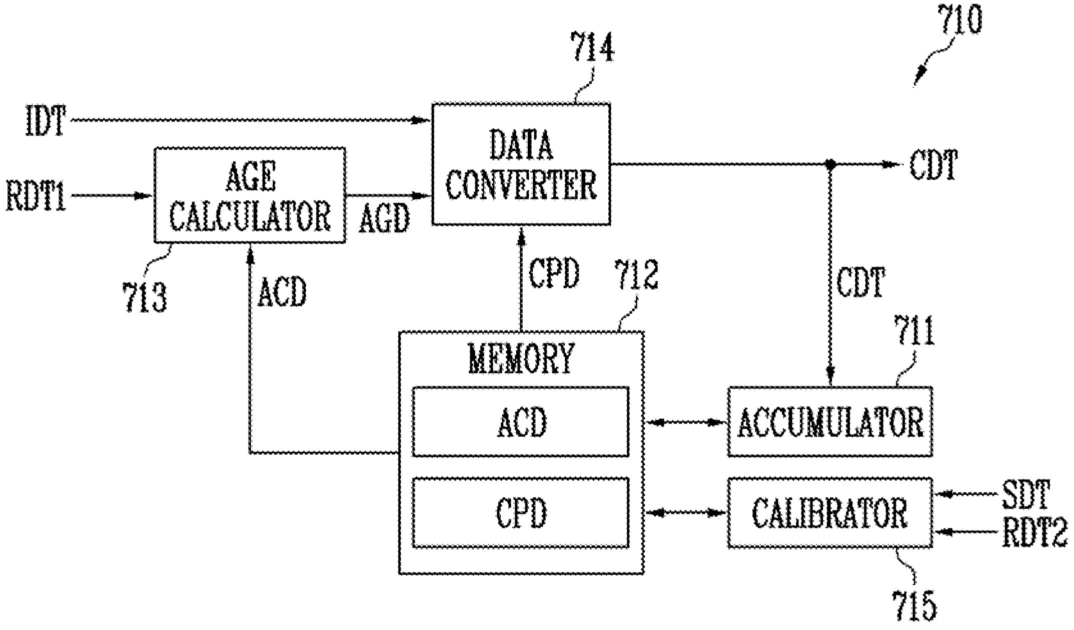
FIG. 8 is a block diagram illustrating a degradation compensator according to an embodiment of the present disclosure.

FIG. 8 is a block diagram illustrating a degradation compensator 710 according to an embodiment of the present disclosure. For example, as in the display device 10 of FIG. 1, FIG. 8 may illustrate the degradation compensator 710 corresponding to an embodiment in which one second pixel PX2 is provided.

Figure 9:
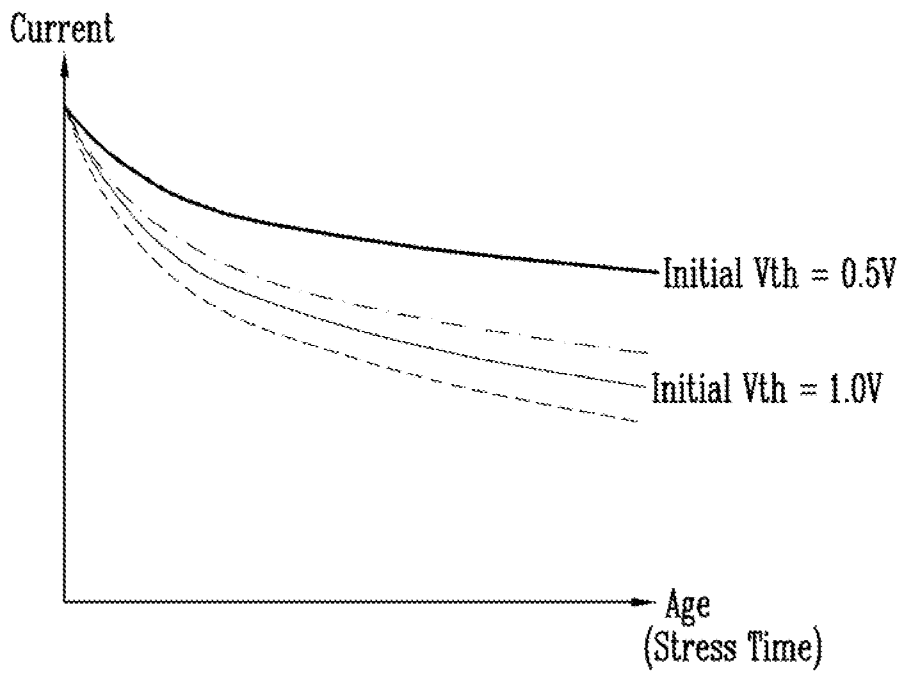
FIG. 9 is a graph schematically illustrating a change of a current according to an age of a pixel and an initial threshold voltage of a driving transistor.
Figure 10:
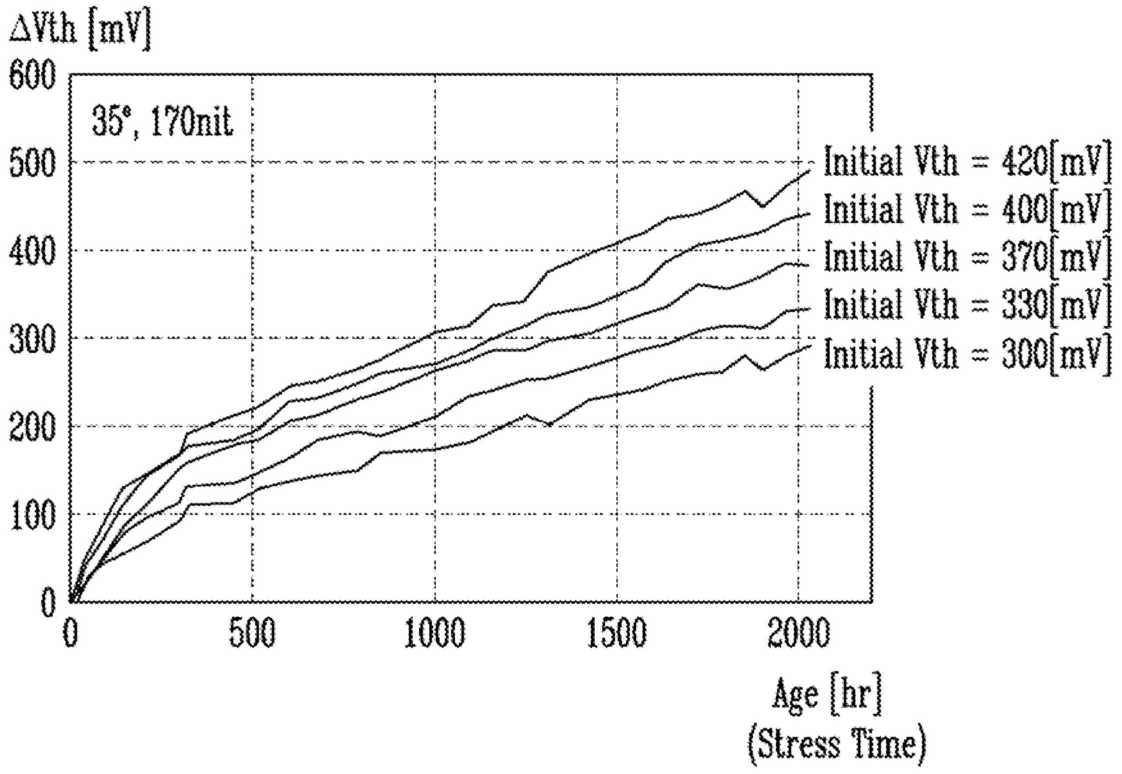
FIG. 10 is a graph illustrating a threshold voltage change amount of the driving transistor according to the age of the pixel and the initial threshold voltage of the driving transistor.
Figure 11:
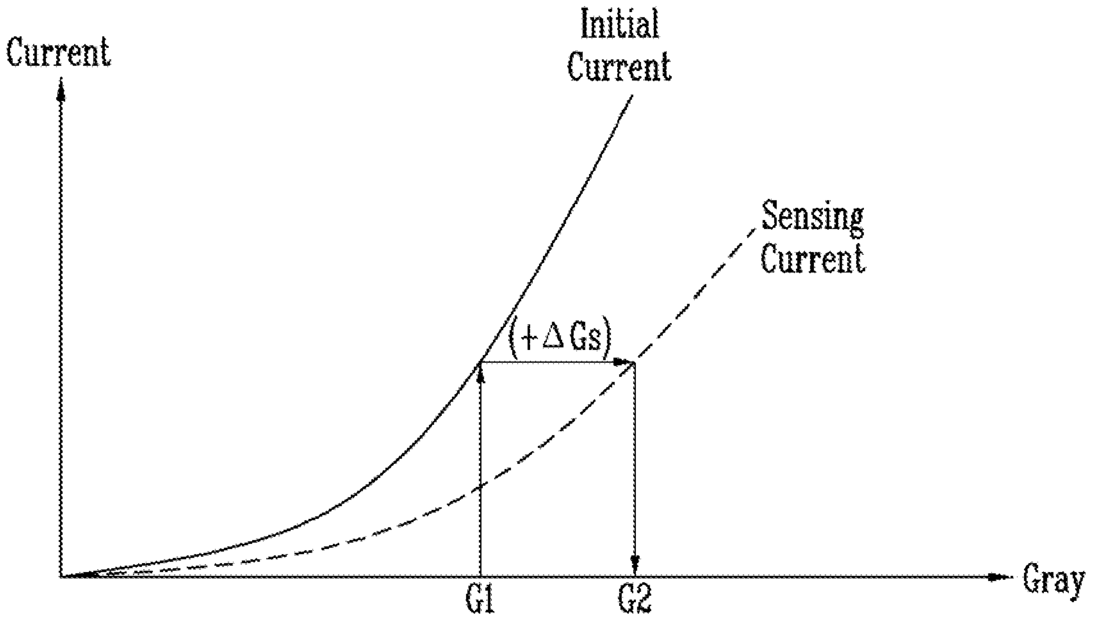
FIG. 11 is a graph illustrating a method of calculating a compensation value corresponding to sensing data SDT.

FIG. 9 is a graph schematically illustrating the change of the current according to the age of the pixel and the initial threshold voltage of the driving transistor. FIG. 10 is a graph illustrating a threshold voltage change amount of the driving transistor according to the age of the pixel and the initial threshold voltage of the driving transistor. FIG. 11 is a graph illustrating a method of calculating the compensation value corresponding to the sensing data SDT.

Referring to FIGS. 8 to 11, the degradation compensator 710 may include an accumulator 711, a memory 712, an age calculator 713, a data converter 714, and a calibrator 715.

The accumulator 711 may accumulate the second image data CDT (or the first image data IDT) to generate accumulated data ACD and store the accumulated data ACD in the memory 712. For example, the accumulator 711 may update the accumulated data ACD in real time by adding the second image data CDT generated at a current time point (for example, at least one frame period including a current frame period) to the accumulated data ACD (for example, accumulated data up to a previous frame period) pre-stored in the memory 712. In an embodiment, the accumulator 711 may generate the accumulated data ACD using a data compression method or the like.

The memory 712 may store the accumulated data ACD and representative compensation data CPD. The representative compensation data CPD may be data (for example, data stored in a form of a lookup table) in which a compensation value (for example, a compensation value calculated in a grayscale or voltage domain) for each age and reference grayscale according to a representative current curve modeled based on an initial degradation characteristic measured in the second pixel(s) PX2 of the sample display device(s) of the same model as the display device 10 before shipment of the display device 10. In addition, the representative compensation data CPD may be calibrated for each sensing period (or in at least one sensing period) according to a calibration value generated by the calibrator 715.

The age calculator 713 may calculate the age of the first pixels PX1 based on the accumulated data ACD. In an embodiment, the age calculator 713 may receive first reference data RDT1 and may calculate the age of the first pixels PX1 by additionally reflecting the first reference data RDT1. The first reference data RDT1 may include information related to another factor that may affect the degradation of the first pixels PX1 in addition to the accumulated data ACD. For example, the first reference data RDT1 may include temperature information, initial threshold voltage information of the first transistors T1 provided to the first pixels PX1, and/or the like.

In an embodiment, when the driving transistor (for example, the first transistor T1 (hereinafter, referred to as the "first driving transistor DT1") of the pixel (for example, the first pixel PX1 or the second pixel PX2) or the first transistor T1' (hereinafter, referred to as the "second driving transistor DT2") of the second pixel PX2 is an oxide transistor, the degradation characteristic (for example, a change amount ΔVth of the threshold voltage) of the driving transistor may vary according to an initial threshold voltage Initial Vth of the driving transistor. For example, as shown in FIG. 9, the current curve according to the age of the pixel may vary.

As the initial threshold voltage of the driving transistor increases, a degradation speed of the driving transistor may increase. For example, a current decrease amount according to the age of the pixel having of which the initial threshold voltage of the driving transistor is 1V may be greater than a current decrease amount according to the age of the pixel of which the initial threshold voltage of the driving transistor is 0.5V. In addition, as shown by dotted lines in the graph of FIG. 9, even though the initial threshold voltage of the driving transistor is the same, a current change of different aspects and/or speeds may be exhibited for each pixel and/or display device.

In addition, as shown in FIG. 10, as a result of measuring the change amount ΔVth of the threshold voltage according to the initial threshold voltage of the driving transistor through aging (for example, aging of 2000 hours under temperature and luminance conditions of 35° and 170 nits) during a certain period (for example, 2000 hours), the change amount ΔVth of the threshold voltage may increase according to the age of the pixel as the initial threshold voltage of the driving transistor increases.

Accordingly, the age calculator 713 may calculate the age of the first pixels PX1 by assigning the acceleration coefficient or the weight according to the initial threshold voltage information of the first driving transistors DT1 (for example, the initial threshold voltage or the threshold voltage change amount ΔVth of the first driving transistors DT1 and/or a deviation of the initial threshold voltage or the threshold voltage change amount ΔVth of the first driving transistors DT1). In an embodiment, the initial threshold voltage information of the first transistors T1 may be stored for each block (for example, a first block BLK1 of FIG. 14) including a plurality of first pixels PX1.

The age calculator 713 may output age data AGD including information on the age of the first pixels PX1 calculated based on the accumulated data ACD and the first reference data RDT1 to the data converter 714.

The data converter 714 may generate the second image data CDT based on the first image data IDT, the age data AGD, and the representative compensation data CPD. For example, the data converter 714 may derive each of the compensation values from the representative compensation data CPD according to the age of the first pixels PX1 and may convert the first image data IDT into the second image data CDT by applying the compensation values.

For example, the data converter 714 may derive the compensation value of the age and the grayscale corresponding to each of the first pixels PX1 from the representative compensation data CPD and may change a grayscale value corresponding to the first pixel PX1 among grayscale values included in the first image data IDT by the compensation value. In an embodiment, the data converter 714 may calculate the compensation value using an interpolation method with respect to the compensation value of the age and/or the grayscale which is not stored in the representative compensation data CPD.

The calibrator 715 may calculate the calibration value of the representative compensation data CPD based on the sensing data SDT supplied from the sensor 600 and may calibrate the representative compensation data CPD stored in the memory 712 by applying the calibration value. For example, the calibrator 715 may calibrate the compensation value of the representative compensation data CPD corresponding to the age of the second pixel PX2 in a corresponding sensing period, based on the sensing data SDT, the compensation value of the representative compensation data CPD, and the second reference data RDT2.

In an embodiment, the second reference data RDT2 may include the initial current information (for example, the initial current curve according to the grayscale) of the second pixel PX2 for the grayscale. For example, the second reference data RDT2 may include an initial current value for each grayscale corresponding to the initial current curve according to the grayscale (also referred to as a "target current curve") as shown in FIG. 11. In addition, the second reference data RDT2 may include information on the reference grayscales (for example, the reference grayscales corresponding to the grayscale voltages Vgr supplied to the second pixel PX2 during each sensing period) corresponding to each sensing data SDT.

The calibrator 715 may derive a sensing current curve (for example, a current curve corresponding to the dotted line of FIG. 11) at an age corresponding to a corresponding sensing period based on the sensing data SDT supplied for each sensing period. The calibrator 715 may calculate the compensation value for each reference grayscale using the initial current curve and the sensing current curve. For example, to allow a current of the same magnitude as a current in the initial current curve corresponding to a first reference grayscale G1 to flow through the second pixel PX2, when a grayscale voltage Vgr corresponding to a second grayscale G2 to be supplied to the second pixel PX2, a grayscale compensation value ΔGs for the first reference grayscale G1 at the corresponding age may be the same as in Equation 5 below.

$$\Delta Gs = G2 - G1 \qquad \text{[Equation 5]}$$

(Here, AGs is the compensation value for the first reference grayscale G1 (for example, the compensation value calculated in the grayscale domain), G1 is the first reference grayscale, and G2 is the grayscale value in the sensing current curve corresponding to the initial current curve for the first reference grayscale G1)

A method of calculating the compensation value for each age and the first reference grayscale G1 from the second pixel PX2 of the sample display device when generating the representative compensation data CPD may be the same as the above-described method. For example, during aging for the sample display device, the compensation value may be calculated for each age and reference grayscale, by using the initial current curve corresponding to the initial current characteristic of the second pixel PX2 and the sensing current curve derived from the current I_PX2 flowing through the second pixel PX2 at each aging time point while aging is progressed. The calculated compensation values may be recorded in a form of a lookup table for each age and reference grayscale and may be stored as the representative compensation data CPD in the display devices 10 (for example, in the memory 712) of the same model as the sample display device.

The calibrator 715 may compare the compensation value ΔGs derived from the sensing data SDT in the corresponding age and reference grayscale with the compensation value of the representative compensation data CPD and may calculate a value corresponding to a difference as the calibration value.

For example, the calibration value for the first reference grayscale G1 in the corresponding age and reference grayscale may be the same as in Equation 6 below.

$$\Delta G\mathrm{cal} = \Delta Gs - \Delta\Delta Gr \quad \text{[Equation 6]}$$

(Here, ΔGcal is the calibration value of the representative compensation data CPD for the first reference grayscale G1, ΔGs is the compensation value for the first reference grayscale G1 based on the sensing current, and ΔGr is the compensation value of the representative compensation data CPD for the first grayscale G1)

The calibrator 715 may apply the calculated calibration value ΔGcal to calibrate the compensation value ΔGr for the first reference grayscale G1 at the age corresponding to the corresponding sensing period among the compensation values of the representative compensation data CPD. In an embodiment, the calibrator 715 may directly change the compensation value ΔGr for the first reference grayscale G1 at the age corresponding to the corresponding sensing period among the compensation values of the representative compensation data CPD to the compensation value ΔGs for the first reference grayscale G1 based on the sensing current.

In an embodiment, the second reference data RDT2 may further include initial threshold voltage information (for example, an initial threshold voltage and/or a threshold voltage change amount (hereinafter, referred to as "sample threshold voltage information") of the driving transistor (hereinafter, referred to as a "sample transistor") included in the second pixel PX2 of the sample display device). The calibrator 715 may use the sample threshold voltage information to determine whether to calibrate the representative compensation data CPD or to calculate the calibration value ΔGcal.

For example, the calibrator 715 may derive the initial threshold voltage information (for example, the initial threshold voltage and/or the threshold voltage change amount) of the second driving transistor DT2 from the sensing data SDT. The calibrator 715 may use the initial threshold voltage information of the second driving transistor DT2 and the sample threshold voltage information to determine whether to calibrate the representative compensation data CPD or to calculate the calibration value ΔGcal.

In an embodiment, the calibrator 715 may compare the initial threshold voltage information of the second driving transistor DT2 with the sample threshold voltage information to determine whether to calibrate the representative compensation data CPD based on the sensing data SDT generated in the corresponding sensing period. For example, the calibrator 715 may determine reliability (for example, a noise level) of the sensing data SDT by deriving a difference value between the initial threshold voltage information of the second driving transistor DT2 and the sample threshold voltage information. When it is determined that the reliability of the sensing data SDT is low, the calibrator 715 might not calibrate the representative compensation data CPD and may calibrate the compensation value of the representative compensation data CPD based on the sensing data SDT.

In an embodiment, the calibrator 715 may compare the initial threshold voltage information of the second driving transistor DT2 with the sample threshold voltage information to derive a difference between degradation characteristics (for example, degradation rates or degradation speeds) of the second driving transistor DT2 and the sample transistor. The calibrator 715 may derive an age of the sample transistor corresponding to the age of the second driving transistor DT2, based on the difference between the degradation characteristics of the second driving transistor DT2 and the sample transistor. The calibrator 715 may derive a compensation value corresponding to the age of the sample transistor from the representative compensation data CPD in a state in which the age of the driving transistor DT2 and the age of the sample transistor are identically matched. The calibrator 715 may calibrate the compensation value of the representative compensation data CPD by applying a calibration value corresponding to a difference value between the compensation value of the representative compensation data CPD and the compensation value derived from the sensing data SDT. For example, the calibrator 715 may calculate an age corresponding to a time point at which the sample transistor is degraded substantially identically to or similarly to the second driving transistor DT2 by reflecting the difference between the degradation speeds of the sample transistor and the second driving transistor DT2, without simply comparing the compensation value derived from the sensing data SDT and the compensation value of the representative compensation data CPD in a time zone in which use times of the second driving transistor DT2 and the sample transistor are the same. The calibrator may calibrate the compensation value of the representative compensation data CPD by extracting the compensation value of the representative compensation data CPD for the calculated age and comparing the compensation value with the compensation value derived from the sensing data SDT. When the first image data IDT is converted into the second image data CDT by using the calibrated compensation value of the representative compensation data CPD, the age of the first pixels PX1 may be calculated by applying an acceleration coefficient or weight reflecting an initial threshold voltage distribution of the first driving transistors DT1 and may apply the compensation value of the representative compensation data CPD according to the calculated age. Therefore, when the representative compensation data CPD is calibrated by reflecting a degradation deviation due to the initial threshold voltage deviation or the like of the sample transistor and the second driving transistor DT2, the degradation of the first pixels PX1 may be more accurately compensated for.

Figure 12:
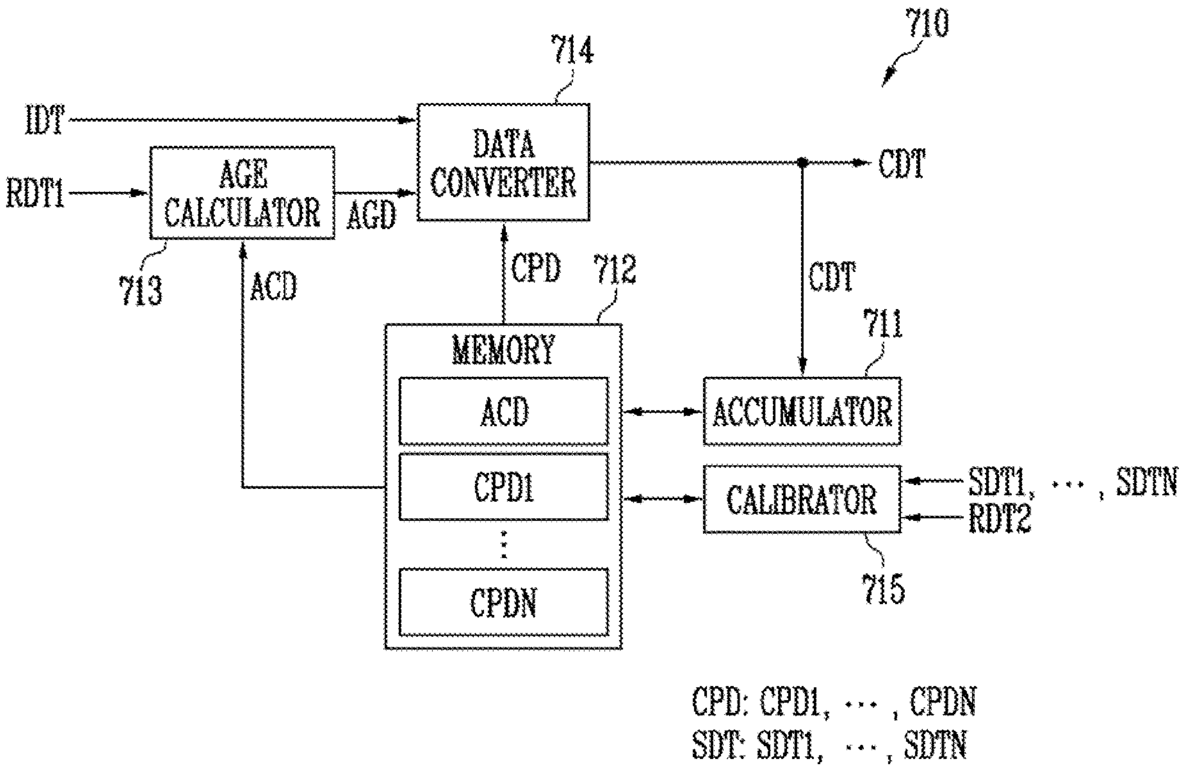
FIG. 12 is a block diagram illustrating a degradation compensator according to an embodiment of the present disclosure.

FIG. 12 is a block diagram illustrating a degradation compensator 710 according to an embodiment of the present disclosure. For example, FIG. 12 may illustrate the degradation compensator 710 corresponding to an embodiment in which at least two second pixels PX2 are provided, as in the display device 10 of FIG. 2. In the embodiment of FIG. 12, the same reference numerals are given to configurations similar to or identical to those of the embodiment of FIG. 8, and to the extent that a detailed description of one or more elements has been omitted, it may be assumed that those elements are at least similar to corresponding elements that have been described elsewhere within the present disclosure.

Figure 13:
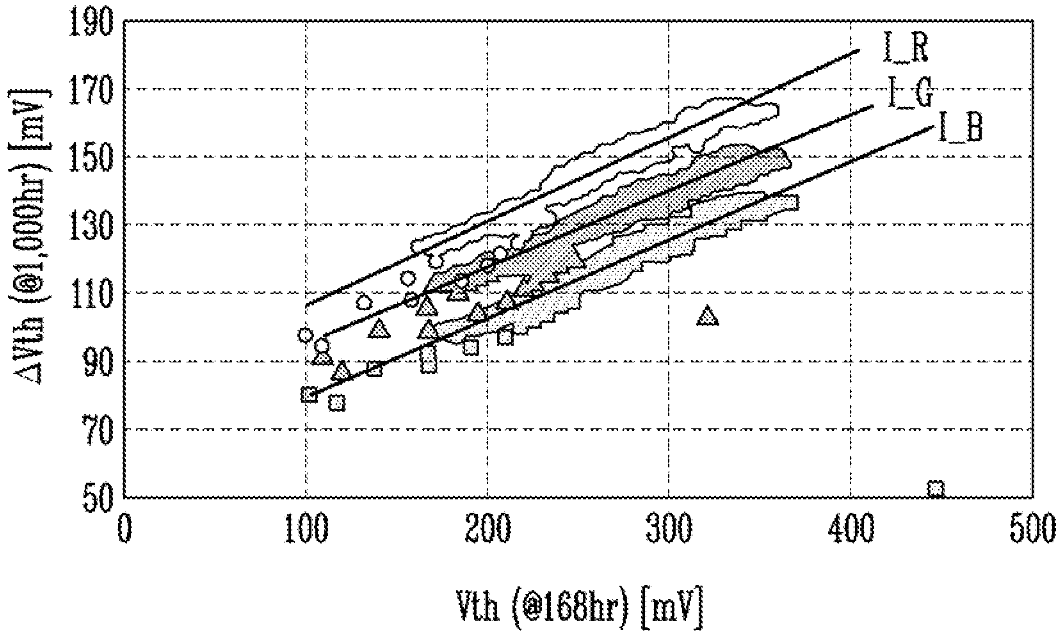
FIG. 13 is a graph illustrating a threshold voltage change amount of the driving transistors according to the initial threshold voltage and the driving current of the driving transistors.

FIG. 13 is a graph illustrating a threshold voltage change amount of the driving transistors according to the initial threshold voltage and the driving current of the driving transistors. For example, FIG. 13 may illustrate the threshold voltage Vth of the driving transistor of each of a red pixel, a green pixel, and a blue pixel at a specific time zone corresponding to the initial of a period in which aging for the sample display device is progressed, and the threshold voltage change amount ΔVth of the driving transistor of each of the red pixel, the green pixel, and the blue pixel according to driving currents I_R, I_G, and I_B corresponding to the highest grayscale of the red pixel, the green pixel, and the blue pixel.

Figure 14:
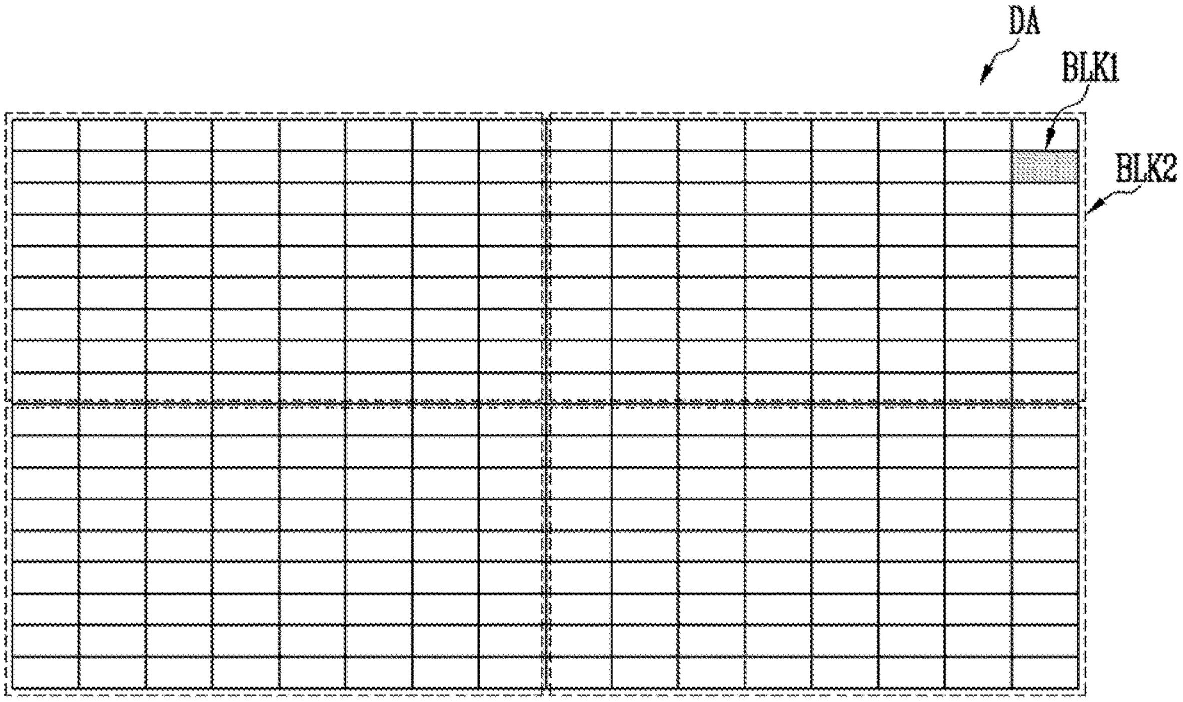
FIG. 14 is a plan view illustrating a display area according to an embodiment of the present disclosure.

FIG. 14 is a plan view illustrating a display area DA according to an embodiment of the present disclosure. For example, FIG. 14 may illustrate an embodiment in which the display area DA is divided into first blocks BLK1 and second blocks BLK2 based on a position of the first pixels PX1 and the second pixel PX2, respectively.

Referring to FIGS. 2 to 14, the display device 10 may include at least two second pixels PX2. The sensor 600 may be electrically connected to the second pixels PX2 to individually sense the current I_PX2 of the second pixels PX2 and generate the sensing data SDT corresponding to each of the second pixels PX2.

The degradation compensator 710 may individually store the representative compensation data CPD corresponding to each of the second pixels PX2. The degradation compensator 710 may individually calibrate the representative compensation data CPD corresponding to each of the second pixels PX2 based on the sensing data SDT generated according to the current I_PX2 flowing through each of the second pixels PX2 for each sensing period.

For example, when the display device 10 includes N (where N is a natural number equal to or greater than 2) second pixels PX2, the degradation compensator 710 may include N representative compensation data CPD1 to CPDN, and individually calibrate and update the N representative compensation data CPD1 to CPDN based on the sensing data SDT corresponding to each of the second pixels PX2. For example, the first compensation data CPD1 corresponding to the first second pixel PX2 may be periodically and/or conditionally updated based on first sensing data SDT1 corresponding to the first second pixel PX2, and the first compensation data CPDN corresponding to the N-th second pixel PX2 may be periodically and/or conditionally updated based on N-th sensing data SDTN corresponding to the N-th second pixel PX2.

In an embodiment, the first pixels PX1 may include pixels of different colors. For example, the first pixels PX1 may include first color pixels (for example, red pixels), second color pixels (for example, green pixels), and third color pixels (for example, blue pixels). The first color pixels, the second color pixels, and the third color pixels may receive data signals of different data voltages Vdata with respect to the same grayscale and/or luminance and may exhibit different degradation characteristics.

For example, the change amount ΔVth of the threshold voltages of the driving transistors at a time point at which more time elapsed (for example, 1000 hours) may vary according to the initial threshold voltage and the driving current, according to the initial threshold voltage and the driving current of each of the driving transistors (for example, the first driving transistors DT1 and/or the second driving transistors DT2) at an initial specific time (for example, 168 hours) while aging is progressed as shown in FIG. 13. For example, when the driving transistors having the same initial threshold voltage are driven with each of a driving current I_R corresponding to a peak luminance of the red pixel, a driving current I_G corresponding to a peak luminance of the green pixel, and a driving current I_B corresponding to a peak luminance of the blue pixel, the change amount ΔVth of the threshold voltage of the driving transistors may be different from each other. In addition, when the driving transistors are driven with the same driving current (for example, the driving current I_R, I_G, or I_B corresponding to the peak luminance of the red pixel, the green pixel, or the blue pixel), the change amount ΔVth of the threshold voltage of the driving transistors may be different from each other according to the initial threshold voltages of the driving transistors.

In an embodiment, the different second pixels PX2 may be used to sense degradation characteristics of the first color pixels, the second color pixels, and the third color pixels, respectively. For example, each of the second pixels PX2 may receive the grayscale voltage Vgr corresponding to the data voltage Vdata supplied to the first color pixels, the second color pixels, or the third color pixels with respect to at least one reference grayscale for each sensing period. Data corresponding to the first color pixels among the first image data IDT may be converted by applying the representative compensation data CPD (for example, the first representative compensation data CPD1) calibrated based on the sensing data (for example, the first sensing data SDT1) corresponding to the second pixel PX2 receiving the grayscale voltage Vgr corresponding to the first color pixels. Data corresponding to the second color pixels among the first image data IDT may be converted by applying the representative compensation data CPD (for example, the second representative compensation data CPD2) calibrated based on the sensing data (for example, the second sensing data SDT2) corresponding to the second pixel PX2 receiving the grayscale voltage Vgr corresponding to the second color pixels. Data corresponding to the third color pixels among the first image data IDT may be converted by applying the representative compensation data CPD (for example, the third representative compensation data CPD3) calibrated based on the sensing data (for example, the third sensing data SDT3) corresponding to the second pixel PX2 receiving the grayscale voltage Vgr corresponding to the third color pixels. Accordingly, degradation of the first color pixels, the second color pixels, and the third color pixels may be more effectively compensated for.

In an embodiment, the display area DA may be divided into at least two second blocks BLK2 based on the second pixels PX2. For example, as shown in FIG. 2, when the second pixels PX2 are dispersedly disposed in four edge areas of the display panel 100, as shown in FIG. 14, the display area DA may be divided into four second blocks BLK2 of **2*2 (two-by-two). The degradation compensator 710 may convert the first image data IDT corresponding to the first pixels PX1 positioned in each of the second blocks BLK2 into the second image data CDT by the representative compensation data CPD corresponding to the second pixel PX2 adjacent to a corresponding second block BLK2. Accordingly, the degradation of the first pixels PX may be more precisely compensated by reflecting a degradation characteristic according to the position of the first pixels PX1**.

In an embodiment, the display area DA may be divided into a plurality of first blocks BLK1 according to the position of the first pixels PX1 regardless of the second pixels PX2. For example, as shown in FIG. 14, the display area DA may be divided into 288 first blocks BLK1 of **16*18 (sixteen-by-eighteen). The first pixels PX1 may be divided into a plurality of groups corresponding to each of the first blocks BLK1. The initial threshold voltage information of the first driving transistors DT1 provided to the first pixels PX1 may be individually stored in the degradation compensator 710 and/or the timing controller 700 for each group and may be used to calculate the age of the first pixels PX1. In an embodiment, the initial threshold voltage information of the first driving transistors DT1 may be stored as the compensation value (for example, the acceleration coefficient or the weight) for compensating for the initial threshold voltage deviation of the first driving transistors DT1** of a corresponding block.

In an embodiment, the initial threshold voltage of the first driving transistors DT1 may be directly sensed from the first pixels PX1 using an inspection device or the like before shipment of the display device 10. For example, while inspection and/or aging of the display device 10 is in progress, a current flowing through the data lines DL may be measured using the inspection device to sense the initial threshold voltage and/or the deviation thereof of the first driving transistors DT.

Figure 15:
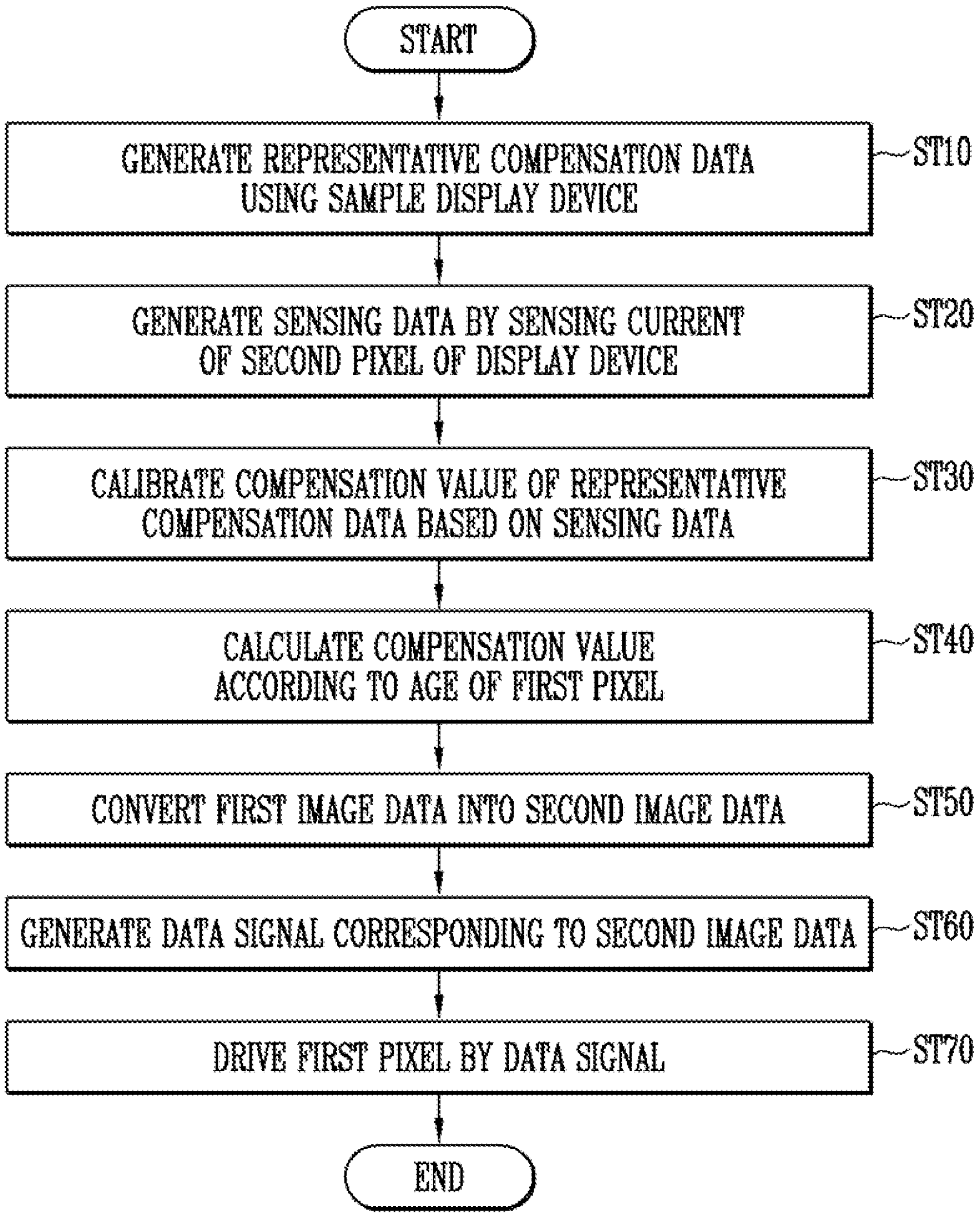
FIG. 15 is a flowchart illustrating a method of compensating for degradation of a display device according to an embodiment of the present disclosure.

FIG. 15 is a flowchart illustrating a method of compensating for degradation of the display device 10 according to an embodiment of the present disclosure. For example, FIG. 15 is a flowchart schematically illustrating the display device 10 described in the embodiments of FIGS. 1 to 14 and a method of compensating for degradation thereof.

Referring to FIGS. 1 to 15, first, the representative compensation data CPD may be generated using the sample display device. The representative compensation data CPD may be executed before shipment of the display devices 10 of the same model as the sample display device and may be stored in the memory 712 of each of the display devices 10 (ST10).

After each display device 10 is actually used, the sensing data SDT may be generated by sensing the current I_PX2 of the second pixel(s) PX2 provided to the display device 10. For example, the sensing data SDT may be generated by sensing the current I_PX2 of the second pixel(s) PX2 provided to the display device 10 during each sensing period executed periodically and/or conditionally (ST20).

When the sensing data SDT is generated, the compensation value of the representative compensation data CPD may be calibrated based on the sensing data SDT. For example, when the sensing data SDT is supplied to the degradation compensator 710, the degradation compensator 710 may calibrate a first compensation value of an age corresponding to a time point at which the sensing data SDT is generated among the compensation values of the representative compensation data CPD. In an embodiment, the degradation compensator 710 may derive the initial threshold voltage information of the second driving transistor(s) DT2 from the sensing data SDT, and compare the initial threshold voltage information with the pre-stored sample threshold voltage information, to derive the first compensation value from the representative compensation data CPD. For example, the degradation compensator 710 may derive an age corresponding to a time point at which the sample transistor is degraded to the substantially the same extent as the second driving transistor(s) DT2, and may extract or calculate the first compensation value corresponding to the age from the representative compensation data CPD. The degradation compensator 710 calculates a second compensation value (for example, the compensation value ΔGs of FIG. 11) based on the sensing data SDT and calibrate the first compensation value by a difference between the first compensation value and the second compensation value (ST30).

During the display period, an image corresponding to the first image data IDT may be displayed in the display area DA by the first pixels PX1. In displaying the image, the first image data IDT may be converted into the second image data CDT based on the age of the first pixels PX1 and the representative compensation data CPD, and the first pixels PX1 may be driven by the data signals corresponding to the second image data CDT. Accordingly, the degradation of the first pixels PX1 may be compensated for and image quality of the display device 10 may be maintained.

To this end, each of the compensation values according to the age of the first pixels PX1 may be calculated. For example, the age of the first pixels PX1 may be calculated based on the accumulated data ACD obtained by accumulating the second image data CDT, and the compensation values corresponding to each age for the first pixels PX1 may be derived using the representative compensation data CPD. For example, each age corresponding to the use amount of the first pixels PX1 may be calculated using the accumulated data ACD and the first reference data RDT1. According to the calculated age of the first pixels PX1, each of the compensation values for the first pixels PX1 may be derived from the representative compensation data CPD (ST40).

When the each of the compensation values for the first pixels PX1 is derived, the first image data IDT may be converted into the second image data CDT by applying the compensation values. For example, the second image data CDT may be generated by converting the grayscale values of the first image data IDT corresponding to each of the first pixels PX1 by applying each of the compensation values (ST50).

Thereafter, the data signals corresponding to the second image data CDT may be generated. For example, the second image data CDT generated by the degradation compensator 710 may be supplied to the data driver 400. The data driver 400 may generate the data signals corresponding to the second image data CDT (ST60).

Thereafter, the first pixels PX1 may be driven by the data signals. For example, the data driver 400 may output each of the data signals to the data lines DL connected to the first pixels PX1. The data signals supplied to the data lines DL may be supplied to each of the first pixels PX1 by the first scan signals GW. Accordingly, the first pixels PX1 may emit light with a luminance corresponding to each of the data signals, and thus the image corresponding to the first image data IDT may be displayed in the display area DA. For example, as the degradation of the first pixels PX1 is compensated by the second image data CDT, an image of uniform quality corresponding to the first image data IDT may be displayed in the display area DA (ST70).

According to various embodiments of the present disclosure, as described above, the display device 10 may include at least one second pixel PX2 disposed around the first pixels PX1, and the pre-stored representative compensation data CPD may be calibrated and updated in real time by sensing the current I_PX2 flowing through the second pixel PX2. Accordingly, the degradation of the first pixels PX1 may be effectively compensated for according to an actual degradation characteristic (for example, a degradation speed and a current and/or luminance change amount according to the degradation) of the display device 10.

In an embodiment, the first pixels PX1 may include circuit elements for independently compensating for the threshold voltage deviation of the first driving transistors DT1. Accordingly, a luminance deviation of the first pixels PX1 due to the threshold voltage deviation of the first driving transistors DT1 may be prevented, and an image of uniform quality may be displayed.

According to the above-described embodiments, by applying a hybrid compensation method combining an internal compensation method and an external compensation method, a characteristic change according to the degradation of the first pixels PX1 and/or a characteristic deviation of the first pixels PX1 may be effectively compensated for. Accordingly, image quality of the display device 10 may be maintained and reliability may be increased.

Although the present disclosure has been specifically described according to the above-described embodiments, it should be noted that the above-described embodiments are for describing the present disclosure and not necessarily for limiting the scope of the present disclosure. Those of ordinary skill in the art to which the present disclosure pertains will understand that various modifications are possible within the scope of the technical spirit of the present disclosure.

All changes or modifications derived from the meaning and scope of the embodiments described above their equivalents should be construed as being included in the scope of the present disclosure.

What is claimed is:

1. A display device, comprising:

first pixels disposed in a display area and including respective first driving transistors;

a second pixel disposed in a non-display area and including a second driving transistor;

a sensor configured to sense a current of the second pixel during a sensing period, generate sensing data therefrom, and generate a driving signal;

a degradation compensator configured to convert first image data and generate second image data from the converted first image data; and a data driver, separated from the sensor, configured to generate data signals based on the second image data and supply the data signals to the first pixels thereby driving the first pixels, wherein the degradation compensator is further configured to:

calculate an age of the first pixels based on accumulated data obtained by accumulating the second image data and reference data including initial threshold voltage information of the first driving transistors, convert the first image data into the second image data by deriving a compensation value from representative compensation data according to the age of the first pixels, and calibrate the representative compensation data based on the sensing data, and wherein the second pixel comprises a light emitting element, wherein the second pixel is configured to be driven by the driving signal generated by a signal generator disposed within the sensor, wherein the display area is divided into four blocks representing four quadrants of the display area with the first pixels divided between the four blocks, wherein the second pixel includes four second pixels, and wherein the four second pixels are disposed at four corners of the non-display area, each of the four second pixels being proximate to its corresponding block of the display area.

2. The display device according to claim 1, wherein the sensor generates the sensing data by periodically sensing the current of the second pixel, and wherein the degradation compensator calibrates a first compensation value of an age corresponding to a time point when the sensing data is generated, among compensation values included in the representative compensation data.

3. The display device according to claim 2, wherein the degradation compensator is further configured to derive initial threshold voltage information of the second driving transistor from the sensing data and derive the first compensation value from the representative compensation data by comparing the initial threshold voltage information of the second driving transistor with pre-stored sample threshold voltage information.

4. The display device according to claim 2, wherein the degradation compensator is further configured to calculate a second compensation value based on the sensing data, and calibrate the first compensation value by a difference between the first compensation value and the second compensation value.

5. The display device according to claim 1, wherein the degradation compensator comprises:

an accumulator configured to generate the accumulated data;

a memory configured to store the accumulated data and the representative compensation data;

an age calculator configured to calculate the age of the first pixels based on the accumulated data;

a data converter configured to derive the compensation value from the representative compensation data according to the age of the first pixels, and convert the first image data into the second image data by applying the compensation value; and a calibrator configured to calculate a calibration value of the representative compensation data based on the sensing data and calibrate the representative compensation data by applying the calibration value.

6. The display device according to claim 1, wherein the sensor generates sensing data corresponding to each of the four second pixels by sensing a current flowing through the four second pixels during the sensing period.

7. The display device according to claim 6, wherein the degradation compensator individually stores the representative compensation data corresponding to each of the four second pixels, and individually calibrates the representative compensation data corresponding to each of the four second pixels based on the sensing data corresponding to each of the four second pixels.

8. The display device according to claim 7, wherein the first pixels include first color pixels, second color pixels, and third color pixels, and wherein each of the four second pixels receives a grayscale voltage corresponding to a voltage of a data signal supplied to the first color pixels, the second color pixels, or the third color pixels with respect to at least one reference grayscale during the sensing period.

9. The display device according to claim 8, wherein the degradation compensator converts data corresponding to the first color pixels of the first image data, by using the representative compensation data corresponding to the four second pixels, receiving a grayscale voltage corresponding to a voltage of a data signal supplied to the first color pixels.

10. The display device according to claim 7, wherein the degradation compensator converts data corresponding to the first pixels of each of the four blocks among the first image data based on the representative compensation data corresponding to its corresponding one of the four second pixels.

11. The display device according to claim 1, wherein the degradation compensator calculates the age of the first pixels based on initial threshold voltage information of the first driving transistors and the accumulated data.

12. The display device according to claim 11, wherein the initial threshold voltage information of the first driving transistors included in the first pixels of each group is stored for each group.

13. The display device according to claim 1, wherein each of the first pixels comprises:

a first pixel circuit including the first driving transistor; and a light emitting element connected to the first pixel circuit.

14. The display device according to claim 13, wherein the first pixel circuit further comprises:

a first switching transistor connected between a data line and a first node connected to a gate electrode of the first driving transistor and turned on in response to a first scan signal;

a second switching transistor connected between a reference power line to which a reference power voltage is applied and the first node, and turned on in response to a second scan signal;

a first capacitor connected between a second node between the first driving transistor and the light emitting element and the first node;

a third switching transistor connected between an initialization power line to which an initialization power voltage is applied and the second node, and turned on in response to a third scan signal;

a fourth switching transistor connected between a first power line to which a first power voltage is applied and the first driving transistor, and turned off in response to an emission control signal; and a second capacitor connected between the first power line and the second node.

15. The display device according to claim 13, wherein the second pixel comprises:

a second pixel circuit including the second driving transistor; and the light emitting element is connected to the second pixel circuit.

16. The display device according to claim 15, wherein a structure of the first pixel circuit is identical to a structure of the second pixel circuit.

17. The display device according to claim 15, wherein the first pixel circuit and the second pixel circuit have different structures from one another.

18. The display device according to claim 1, further comprising:

a switch connected between the second pixel and the sensor, wherein the switch is turned on during the sensing period.

19. The display device according to claim 1, wherein the second pixel receives a grayscale voltage corresponding to at least one reference grayscale during the sensing period and receives a grayscale voltage corresponding to a highest grayscale during a display period in which the first pixels are driven except for the sensing period.

20. A method of compensating for degradation of a display device including first pixels disposed in a display area and including respective first driving transistors, and a second pixel disposed in a non-display area and including a second driving transistor, the method comprising:

generating sensing data by sensing a current of the second pixel during a sensing period and a driving signal using a sensor;

calibrating representative compensation data based on the sensing data;

calculating an age of the first pixels based on reference data including initial threshold voltage information of the first driving transistors;

calculating compensation values according to the age of the first pixels by using the representative compensation data;

converting first image data into second image data by applying the compensation values;

generating data signals corresponding to the second image data; and driving the first pixels by the data signals, wherein the second pixel comprises a light emitting element, wherein the driving of the first pixels is performed by a data driver that is separated from the sensor, wherein the second pixel is driven by a driving signal generated by a signal generator that is disposed within the sensor, wherein the display area is divided into four blocks representing four quadrants of the display area with the first pixels divided between the four blocks, wherein the second pixel includes four second pixels, and wherein the four second pixels are disposed at four corners of the non-display area, each of the four second pixels being proximate to its corresponding block of the display area.

21. An electronic device, comprising:

a plurality of first pixels disposed within a display area of a display device;

a second pixel disposed within a non-display area of the display device;

a sensor configured to sense a current of the second pixel and generate a driving signal; and an image compensator configured to receive a first image signal, convert the received first image signal to a second image signal based on the sensed current of the second pixel, and display the second image signal on the plurality of first pixels using a data driver that is separated from the sensor, wherein the image compensator is further configured to calculate an accumulated sensed current of the second pixel over time, estimate a degree of accumulated usage of the plurality of first pixels from the accumulated sensed current of the second pixel over time reference data including initial threshold voltage information of first driving transistors of the first pixels, and convert the received first image signal into the second image signal based on the estimated degree of accumulated usage of the plurality of first pixels, wherein the second pixel comprises a light emitting element, wherein the second pixel is configured to be driven by the driving signal generated by a signal generator disposed within the sensor, wherein the display area is divided into four blocks representing four quadrants of the display area with the first pixels divided between the four blocks, wherein the second pixel includes four second pixels, and wherein the four second pixels are disposed at four corners of the non-display area, each of the four second pixels being proximate to its corresponding block of the display area.

22. The electronic device of claim 21, wherein the electronic device further includes a memory for storing a table of compensation values for converting the received first image signal to a second image signal based on the sensed current of the second pixel.

* * * * *